United States Patent [19]
Kaenel et al.

[11] 3,882,606
[45] May 13, 1975

[54] METHOD AND APPARATUS FOR MEASURING CURVATURE AND CURVATURE VARIATIONS IN PIPELINES AND THE LIKE

[75] Inventors: Reginald A. Kaenel, Weston, Conn.; Alfred E. Crouch, Friendswood, Tex.

[73] Assignee: AMF Incorporated, White Plains, N.Y.

[22] Filed: May 16, 1973

[21] Appl. No.: 360,899

[52] U.S. Cl.................. 33/174 L; 33/141 G; 33/142
[51] Int. Cl. ............................................. G01b 7/28
[58] Field of Search............ 33/174 R, 174 L, 174 P, 33/141.5, 142, 1 H, 141 R, 141 G

[56] References Cited
UNITED STATES PATENTS

| | | | |
|---|---|---|---|
| 2,245,221 | 6/1941 | Nudson et al...................... | 33/141 G |
| 3,495,340 | 2/1970 | Bunnell............................. | 33/174 R |
| 3,496,644 | 2/1970 | Short................................. | 33/174 R |
| 3,500,549 | 3/1970 | Smith................................ | 33/174 R |
| 3,718,978 | 3/1973 | Van Koevering et al.......... | 33/174 R |
| 3,780,442 | 12/1973 | Gresho.............................. | 33/174 R |
| 3,789,511 | 2/1974 | Groom et al...................... | 33/174 L |

Primary Examiner—Richard E. Aegerter
Assistant Examiner—Richard R. Stearns
Attorney, Agent, or Firm—George W. Price; John H. Gallagher

[57] ABSTRACT

Pipeline curvature is detected, measured and recorded by an instrumented pig carrying an array of sensing wheels down a length of pipeline with the sensing wheels engaging the inner wall of the pipeline in a symmetrical configuration about the axis of the pipeline. The rotation of the sensing wheels is encoded as a function of the distance travelled by each wheel over predetermined increments of axial travel of the array down the pipeline to provide periodic readout of curvature parameters between known positions (over known increments of length) of the run of pipeline traversed by the pig. A magnetic tape recorder in the pig records the curvature readout for each incremental length of pipeline traversed to provide a recorded profile of curvature correlated to position along the run to establish initial acceptable curvature conditions therefor. A succeeding run of the pig through the same run of pipeline results in a second profile which can be compared with the first profile in a computer to determine variations in curvature from the initial conditions together with the location of such variations along the run.

78 Claims, 19 Drawing Figures

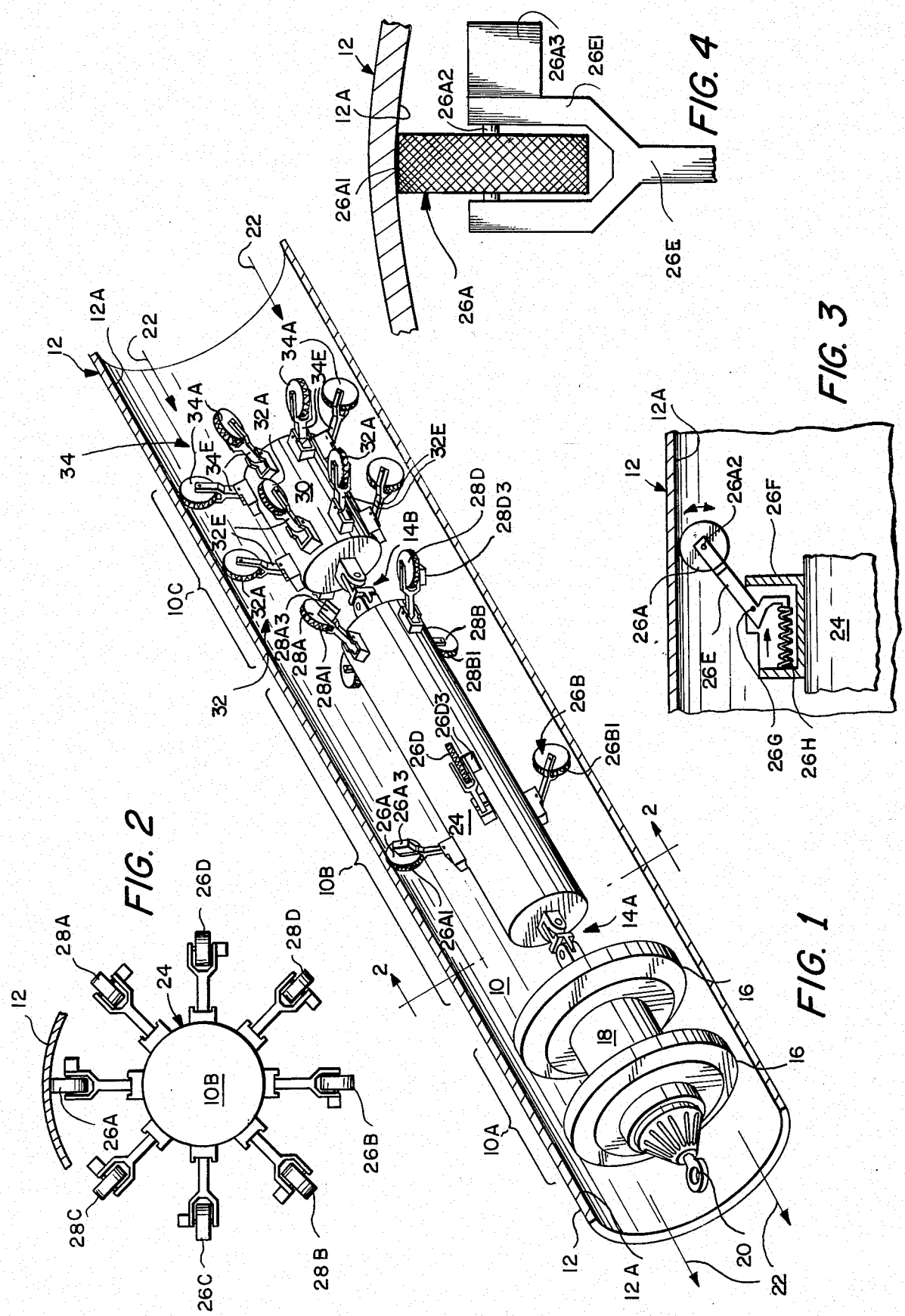

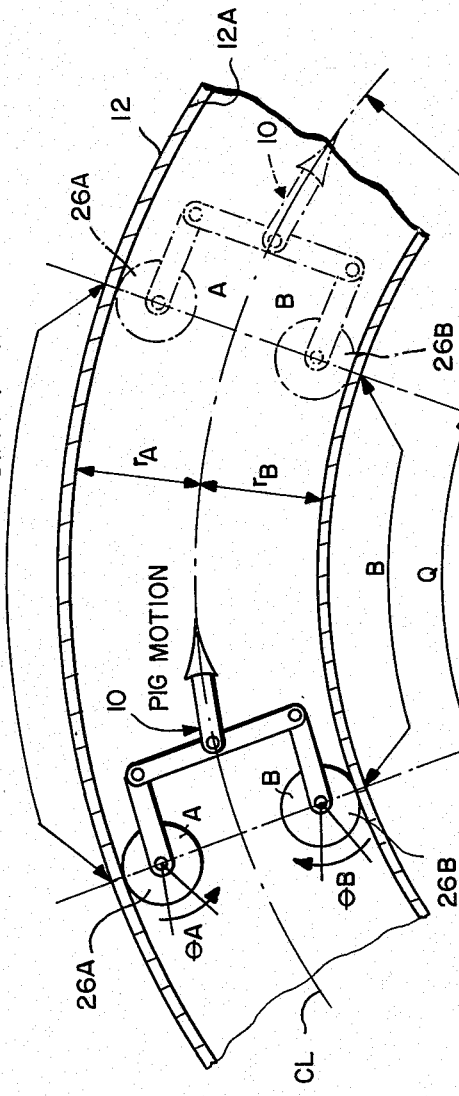
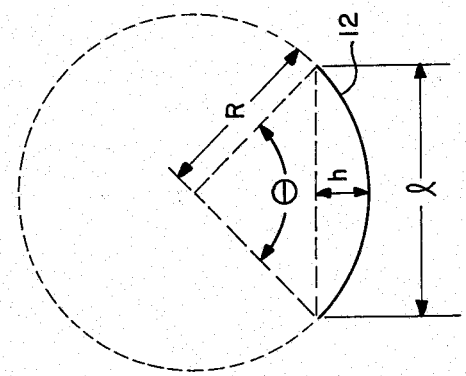
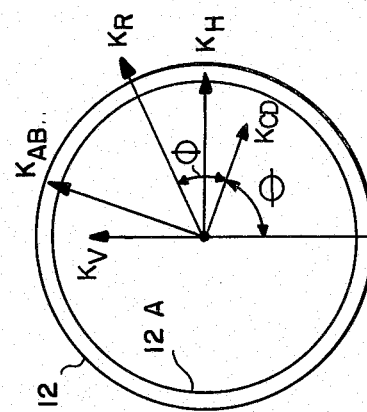
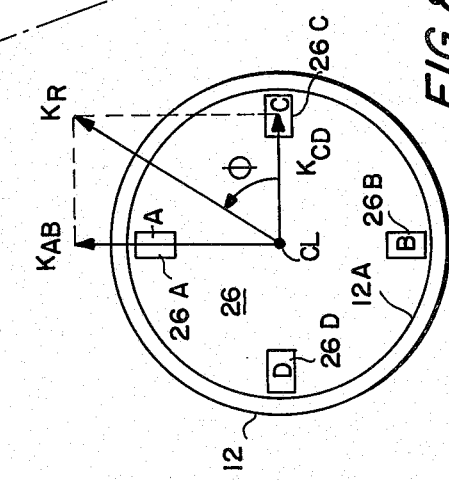

UP COUNTER CABN OUTPUTS WHEN r(A+B) = POWER OF 10
UP COUNTER CCDN OUTPUTS WHEN r(C+D) = POWER OF 10
r = PIPE RADIUS

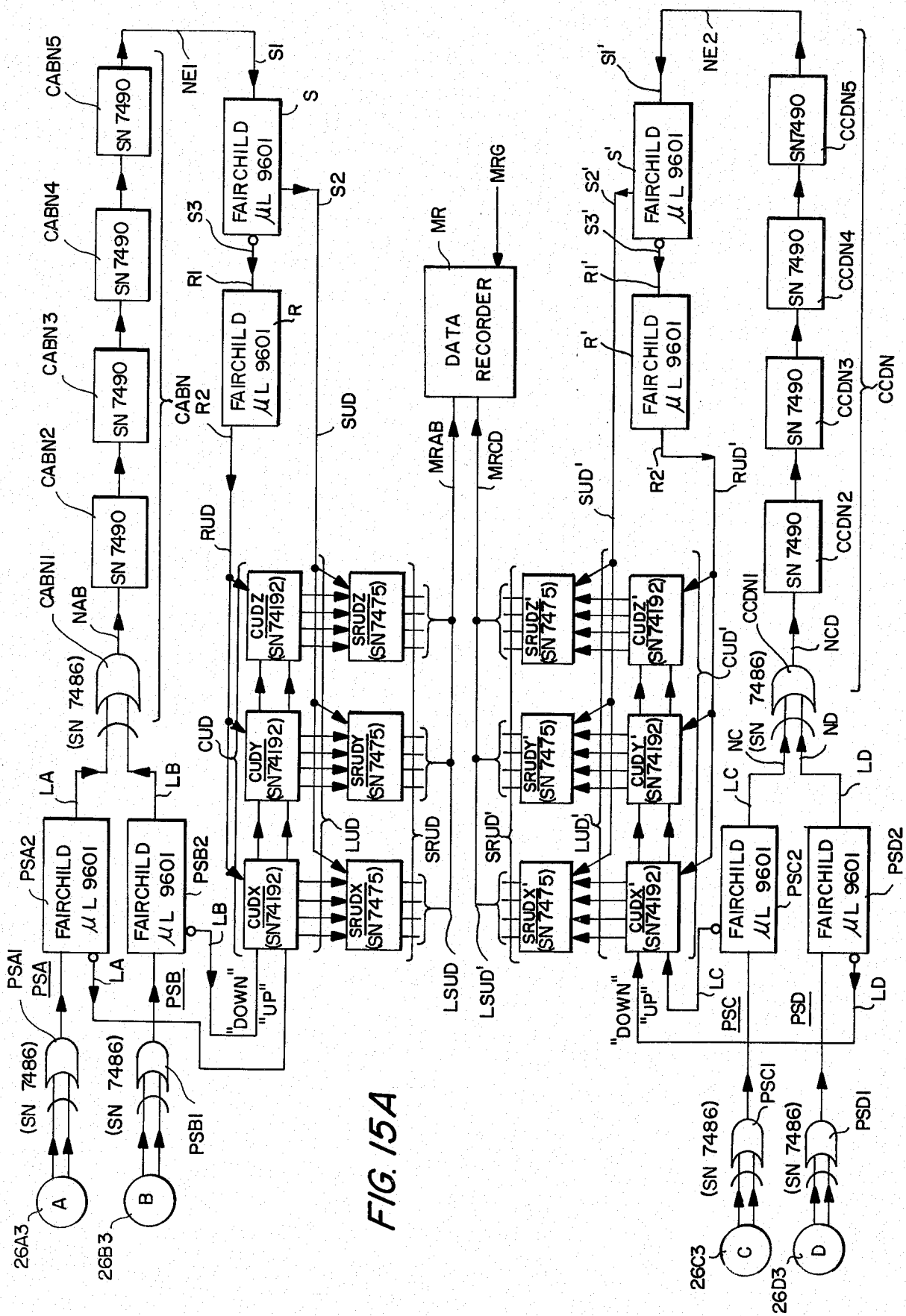

METHOD AND APPARATUS FOR MEASURING CURVATURE AND CURVATURE VARIATIONS IN PIPELINES AND THE LIKE

This invention relates to methods and apparatus for determining variations in curvature in a pipeline and more particularly, to a method of determining this curvature and locating the position thereof in a length of pipeline together with in-pipe transducer means to gather the data required to determine such curvatures and the location thereof.

BACKGROUND OF THE INVENTION

In order to properly protect the ecological environment surrounding, for example, oil pipelines, it is desirable to monitor and promptly detect movement of the pipeline due to unstable or variable soil conditions or other forces which cause such movement.

One of the parameters indicating the effects of such a movement or shifting of a pipeline is a resulting curvature in the pipeline which exceeds desirable tolerances.

Another parameter to be determined is the accurate location of the excessive curvature condition on the pipeline such that preventive maintenance may be promptly made at that location.

For example, in arctic environs, pipeline could be laid close to, below or well above the surface of arctic tundra in which permanently frozen (permafrost) conditions exist in the subsoil. This coupled with the fact that heated oil flows through the pipeline at temperature ranging, for example, from 20°F to 145°F, could result in a thawing of the subsoil in immediate proximity to the pipeline and/or its various supporting structures.

Such a melting condition could result in a sinking or shifting of the pipeline sections into positions or attitudes with respect to the lay of the rest of the line that will result in localized curvatures of the line in excess of desired tolerances.

In order to prevent potential over stressing of the line should these curvatures finally exceed acceptable tolerances, early detection of substantially the exact curvatures of the pipeline between each pair of multiplicity of sampling positions such as, for example, every 4 feet along its length, should be monitored and determined at regular inspection intervals or immediately after known disturbances such as earth tremors or severe storms have occurred.

It is, therefore, an object of the present invention to provide a new and novel method of determining the amount of curvature to a pipeline at any given selected position along the length thereof.

Another object of the present invention is to provide new and novel transducer means for gathering and recording curvature and position data internally of a pipeline.

Another object of the present invention is to provide new and novel transducer means for gathering and recording curvature and position data internally of a pipeline, comprising, a pig having three or more wheels in a predetermined array extending from the pig into rolling contact with the internal wall of said pipeline, said wheels driving encoding means providing output data representative of wheel travel and rotation, circuit means responsive to and operating on said data to provide signals functionally interrelated to represent pipeline curvature and correlated pig position and recording means for output signals, retaining the latter for subsequent computer analysis of said pipeline curvature and said correlated pig position.

These and other objects of the present invention will become more fully apparent with reference to the following specification and drawings which relate to several preferred embodiments of the invention.

In the drawings:

FIG. 1 is a perspective view of an instrumented pig of the present invention disposed in a partial cross-section of a pipeline;

FIG. 2 is a cross-section taken along line 2—2 of FIG. 1 illustrating sensing arrays of the present invention;

FIG. 3 is an enlarged schematic of the biasing and mounting means for a sensing wheel in the sensing arrays of the present invention;

FIG. 4 is an enlarged detail of a sensing wheel and associated shaft encoder;

FIG. 5 is a schematic illustrating the definition of curvature;

FIG. 6 is a schematic of a differential sensing wheel means for detecting curvature and the related physical parameters defining curvature;

FIGS. 7, 8 and 9 are related schematics illustrating the physical parameters of curvature as associated with a sensing array of orthogonal pairs of diametrically opposed sensing wheels;

FIG. 15A is a more detailed schematic of FIG. 15 illustrating the use of commercially available components for constructing same;

SUMMARY OF THE INVENTION

Figure 14:
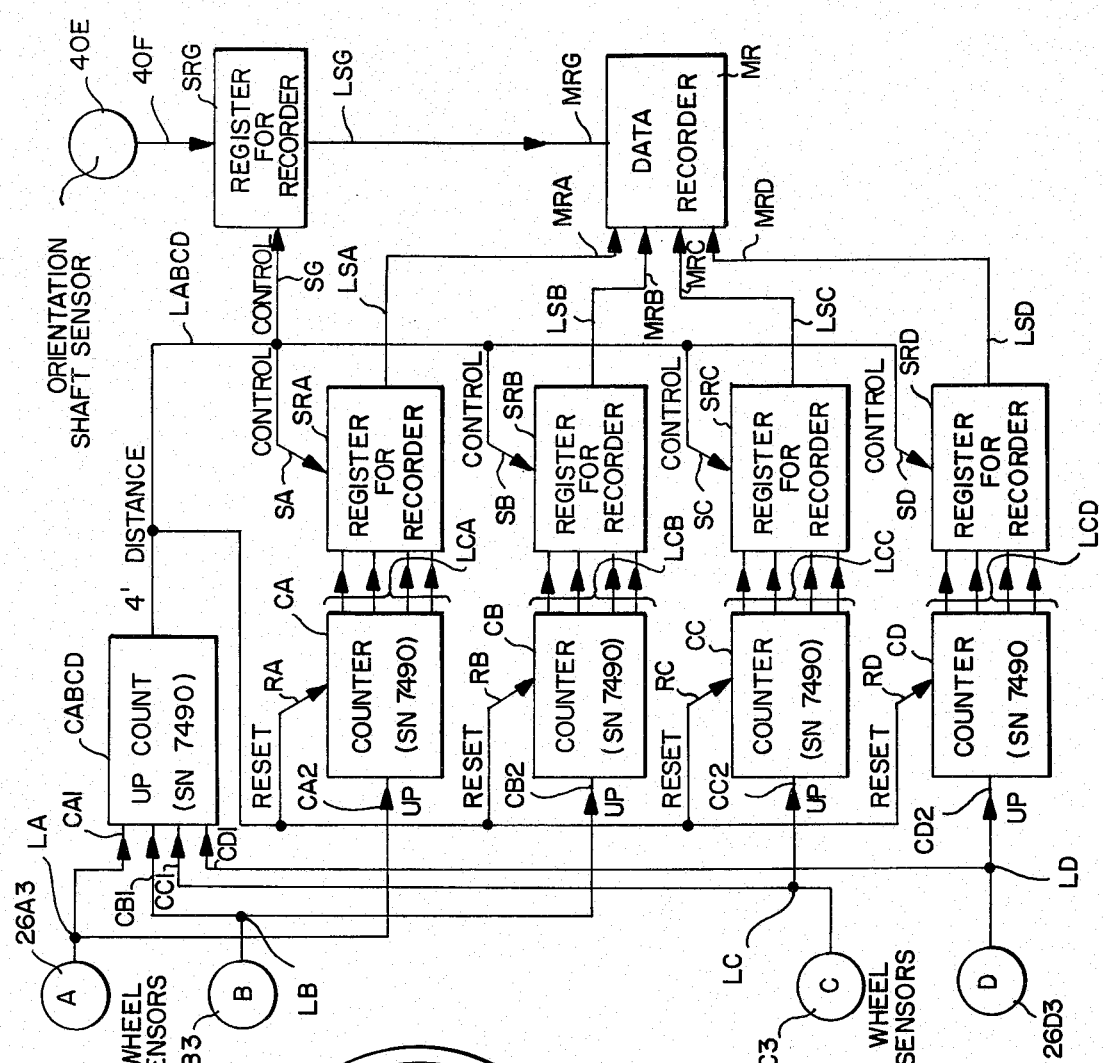
FIG. 14 is a schematic of a first embodiment of a curvature sensing transducer and recording means of the present invention.

For a curved piece of pipe, the distance along the outside of the curve is greater than the distance along the inside of the curve.

Based on this fact, an array of wheels in a known configuration rolling along the internal wall of the pipe and mounted on a self-contained survey pig travelling within the pipe, as in the present invention, will experience a difference in distance travelled by each such wheel in the array when traversing a curved section of the pipe.

By encoding the rotational output of the wheels as a function of axle or shaft position, with digital shaft encoders, for example, sufficient data is obtained in practicing the new and novel method of the present invention to determine the curvature of the pipe in radians per foot and the location in the pipeline of that measured curvature.

In one preferred embodiment of the invention an array of at least three sensing wheels, spaced at 120° and spring biased into positive rolling contact with the internal walls of the pipeline, are mounted on a travelling survey pig maintained at substantially the center of the pipeline by a substantially similar array of guide wheels on the said pig.

The rotational output of each sensing wheel is encoded and fed to one or more counter circuits in predetermined algebraic relation to the encoded outputs from the other sensing wheels in the array, such that the resultant counts generated are a function of the curvature of the pipeline in radians/foot and the distance travelled by the said sensing wheels, such that curvature at a given position in the pipeline subsequently can be calculated.

The mathematical functions and interrelationships of the encoded sensing wheel outputs will be more fully described hereinafter.

In another preferred embodiment of the invention, an array of at least two orthogonally disposed pairs of diametrically opposed sensing wheels are utilized to form an array with the individual encoded outputs of the four sensing wheels comprising the variable parameters for the determination of curvature and the location of that curvature. A suitable counting network is provided in this embodiment to operate on these encoded outputs in a predetermined functional interrelationship.

In other embodiments, arrays of multiplicities of sensing wheels are utilized for the determinations of curvatures and the locations of these curvatures, allowing the compensation of non-circularities of the pipe cross sections.

In all of the preferred embodiments mentioned, an orientation encoding means, such as a damped pendulum with a digital shaft encoder at its pivot point, is provided to effect a positive reference to true vertical (the direction of gravity) as an additional encoded output.

With this additional encoded output, the horizontal and vertical components together with the resultant of the actual pipeline curvature can be determined at any given location along the pipeline.

Both said embodiments include in the survey pig a magnetic tape recorder to record the functionally interrelated counts generated by the counting circuits and the enclosed vertical reference output of the orientation encoding means. Such a recording can be on a continuous basis or on an intermittent basis for predetermined distances of traverse along the pipeline by the sensing wheels on the survey pig.

The recorded data is sufficiently normalized within the survey pig transducing system such that the tape from the recorder can be analyzed by computer in keeping with the method of the present invention to determine variations in curvature of the pipeline beyond predetermined desired limits and the location and orientation of that curvature in the pipeline.

By recording initial curvature vs. distance profiles of the pipeline which are acceptable at the time made, then a computer comparison of the initial recording and subsequent recordings can be utilized as a means of indicating the occurrence of undesirable curvature deviations.

With limits of allowable curvature deviation programmed into the computer, then the computer provides a print-out identifying the specific pipeline locations at which curvature deviations have exceeded the said allowable limits. This permits prompt and accurate pipeline maintenance to preclude over stressing of the pipeline.

THE INSTRUMENTED PIG STRUCTURE

Referring in detail to the drawings and with particular reference to FIG. 1, the instrumented pipeline pig 10 of the present invention is shown traversing a length of pipeline 12 and comprises a tractor section 10A, a transducer section 10B and an instrument section 10C. The tractor section 10A is connected to the transducer section 10B by a first universal joint 14A while the transducer section is connected to the instrument section 10C by a second universal joint 14B.

The tractor section 10A comprises a plurality of axially spaced annular drive cups 16 disposed transversely of the pipeline 12 on housing 18, the latter being adapted to contain support devices, such as batteries, for the transducer section 10B. A forward mounted draft ring or draft coupling 20 is mounted on the housing 18 to assist in launching and recovering the pig 10 from the pipeline 12.

The fluid flow direction in the pipeline 12 is indicated by the arrows 22 in FIG. 1 and the trailing faces of the drive cups 16 are suitably shaped to drive the pig 10 through the pipeline 12 in that flow direction.

Referring jointly to FIGS. 1 and 2, the transducer section 10B of the pig 10 is supporting housing 24 having a first sensing array 26 of orthogonally disposed sensing wheel pairs 26A-26B and 26C-26D symmetrically disposed about the periphery thereof. Axially displaced from said first sensing array 26 is a second sensing array 28 of orthogonally disposed sensing wheel pairs 28A-28B and 28C-28D.

The sensing wheels 26A-D, 28A-D in each designated wheel pair 26A-26B, 26C-26D, 28A-28B and 28C-28D are diametrically opposed in a transverse plane across the pipeline 12 common to each respective sensing array 26 and 28, each said plane being substantially perpendicular to the axis of the pipeline 12.

The sensing wheels 26-A-D and 28A-D are mounted on spring biased radially disposed arms 26E and 28E, respectively, which are pivotally secured in brackets 26F, 28F on the housing 24 such that the said sensing wheels are spring biased into rolling engagement with the inner wall 12A of the pipeline 12. This structure is schematically illustrated in FIG. 3 in which, for the sensing wheel 26A, the radial arm 26E is illustrated as a form of bell crank, mounted on a pivot pin 26G in the bracket 26F on the housing 24, the said bracket 26 acting as a keeper for a calibrated spring 26H which applies bias to the lower end of the radial arm 26E and forces the wheel 26A outward into engagement with the inner wall 12A of the pipeline 12. This is a typical biasing structure for each of the sensing wheels 26A-D, 28A-D.

Also typical of each of the said sensing wheels is the mounting thereof in a bifurcated portion of the radial arms, this bifurcated portion 26E being illustrated in FIG. 4 in conjunction with the sensing wheel 26A. The typical sensing wheel 26A is shown as having a knurled cylindrical peripheral surface 26A1 which actually forms a cord of the arc of that portion of the pipeline surface 12A subtended by the axial dimension of the wheel 26A. Thus, the maximum radial distance from the integral rolling axle 26A2 of the sensing wheel 26A journaled in the bifurcated section 26E1 to the inner wall 12A of the pipeline 12 will remain the same even though the edge portions of the knurled surface 26A1 are subjected to wear. This maintains accuracy between the distance travelled by the knurled surface 26A1 in relation to the number of resulting turns of the rolling axle 26A2, hereinafter designated as the sensing shaft 26A2 with its respective counterparts 26B2-D2 and 28A2-D2 for the other sensing wheels 26B-D and 28A-D.

The sensing shaft 26A2 serves as a rotary input to a digital shaft encoder 26A3 mounted on one leg of the bifurcated portion 26E1 of the radial arm 26E to thereby encode the rotation of the sensing shaft 26A2 as a function of the distance travelled axially along the inner wall 12A of the pipeline 12 by the sensing wheel 26A. Each of the other sensing wheels 26B-D and 28A-D have respectively corresponding digital shaft encoders 26B3-D3 and 28A3-D3 mounted on their respective sensing shafts 28B2-D2 and 28A2-D2 in a like manner.

Thus, the output of each of the sensing wheels 26A-D and 28A-D is monitored and encoded as will be more fully described hereinafter.

An example of a suitable digital shaft encoder for use in the present invention are those marketed by the Encoder Division of Litton Industries as Gallium Arsenide Shaft Encoders described in technical Bulletins 5-70-G, 5-70-LA. 5-70-LI of that company, with an exemplary model number being SNB18-13G10, the latter providing 8192 output counts in natural binary code for each 360° of monitored shaft revolution. Further, as is well known in the art, both absolute position codes or incremented codes can be provided with resolutions on the order of 20,000 to 36,000 counts for each 360° of monitored shaft revolution in commercially available shaft encoders.

The instrument section 10c of the pig 10 includes an instrument housing 30 on which are mounted a pair of axially spaced symmetrical arrays 32 and 34 of resiliently mounted support wheels 32A and 34A, respectively mounted on spring biased radially extending arms 32E and 34E, in similar fashion to the sensing wheels 26A-D and 28A-D in the sensing array 26 and 28 on the transducer section 10B.

The orientation arrays 32 and 34 are to maintain the instrument section 10C substantially coaxial with the pipeline 12 by the action of the support wheels 32A, 34A acting against the inner wall 12A of the pipeline 12. This effect is also achieved by the sensing arrays 26 and 28 on the transducer section 10B.

Accordingly, the pig 10 traverses the pipeline 12 in substantially coaxial relation thereto under the traction influence exerted by the flow of fluid therein on the drive cups 16 of the tractor section 10A of the pig 10.

The instrument housing 30 contains, among other requisite or desired instrumentation, magnetic tape recording means for receiving the normalized data signals resulting from the outputs of the shaft encoders 26A3-D3 and 28A3-D3 in the sensing arrays 26 and 28 on the transducer section 10B of the pig 10.

DETERMINATION OF PIPELINE CURVATURE

Curvature is defined as the change in slope for a unit change in path length and therefore, can readily be expressed in units of radians per foot.

Referring to FIG. 5, consider a length of pipeline 12 which was initially straight but which has deformed so that the center has dropped a distance "$h$" with respect to its ends. If the pipe 12 in its deformed condition assumes an arc of a circle, then the curvature of the pipe 12 will be constant throughout the length of the arc and the magnitude of the curvature will be as follows:

$$\text{Curvature} = \frac{2h}{\frac{l^2}{4} + h^2} \text{ radians/ft.,}$$

where $l$ is the chord of the arc, as illustrated in FIG. 5.

$$\text{Curvature} = \frac{1}{\text{Radius of Curvature "R" in feet}} \text{ radians/ft.}$$

Accordingly, the curvature is a function of the length of the arc. In a pipeline, where two diametrically opposed rolling wheels such as the sensing wheels 26A and 26B travel around the outside and inside of the curvature, the distances travelled by the respective wheels is unequal depending upon the magnitude of curvature.

This becomes readily apparent with reference to FIG. 6, wherein the radius of curvature is determined by the center line CL of the pipeline 12 and the contacting surfaces of the diametrically opposed sensing wheels 26A and 26B are shown displaced therefrom by the equal radial distances $rA$ and $rB$, respectively from the central axis CL to the surface 12A of the pipeline 12.

Therefore, when the pig 10 traverses an arc of radius R through an angle Q, the sensing wheel 26A will traverse a distance A greater than the distance B traversed by the sensing wheel 26A.

From known mathematical relationships the curvature component $K_{AB}$ in the plane of the sensing wheels 26A, 26B can be defined as a function of the distances travelled by the said wheels and the radius $r$ of the pipeline 12 as follows:

$$K_{AB} = \frac{A-B}{r(A+B)}$$

Referring to FIG. 7, which schematically shows the orthogonal sensing array 26, the curvature component $K_{CD}$ in the plane of the sensing wheels 26C, 26D is similarly defined as follows:

$$K_{CD} = \frac{C-D}{r(C+D)}$$

In the foregoing equations, A, B, C and D represent the respective distances travelled by the sensing wheels 26A, 26B, 26C and 26D over a given length of arc of the pipeline 12.

These components of curvature $K_{AB}$ and $K_{CD}$ are shown in FIG. 8 along with the resultant curvature $K_R$ determined by these components as follows:

$$K_R = \frac{1}{r}\sqrt{\left(\frac{A-B}{A+B}\right)^2 + \left(\frac{C-D}{C+D}\right)^2}$$

The direction of curvature, as a function of the angle $\phi$ between the resultant $K_R$ and the component $K_{CD}$ is also determined by the following relationship:

$$\tan\phi = \frac{K_{AB}}{K_{CD}}$$

This direction, however, is only fixed with respect to the geometry of the sensing array 26 and must be related to a standard such as true vertical (the direction of gravity) in order to properly determine the direction of curvature with respect to the pipeline 12 and its environmental orientation. Then, the true vertical and horizontal components of curvature for any given section of the pipeline 12 can be determined.

Referring now to FIG. 9, the true vertical is shown by a vector G in the direction of gravitational pull, which defines an angle $\theta$ with the curvature component $K_{CD}$ in the sensing array 26. The true vertical and horizontal components of curvature $K_V$ and $K_H$, defining the same resultant curvature $K_R$ are a function of the sum of the angles $\phi$ and $\theta$, previously defined as follows:

$$K_V = K_R \cos(\theta + \phi)$$
$$K_H = K_R \sin(\theta + \phi)$$

Therefore, by detecting the angle $\theta$ with suitable sensing means, the nominal components of curvature $K_{AB}$ and $K_{CD}$ sensed by the sensing array 26 can be directly converted to the true vertical and horizontal components $K_V$ and $K_H$.

These calculations can be performed by computer once the parameters A, B, C, D and $\theta$ have been accurately detected and recorded in the pig 10 as will be more fully described hereinafter.

The foregoing description applies to the second sensing array 28 in which the distances travelled by the sensing wheels 28A-D and the angle $\theta$ have the same mathematical interrelationships.

As previously described, both the first and second sensing arrays 26 and 28 comprise orthogonally disposed pairs of diametrically opposed sensing wheels.

Figure 11:
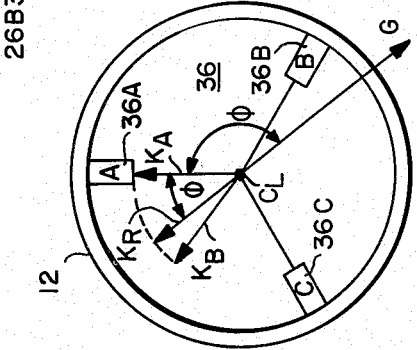
FIGS. 10 and 11 are related schematics illustrating the physical parameters of curvature as associated with a sensing array of three symmetrically oriented sensing wheels.
Figure 10:
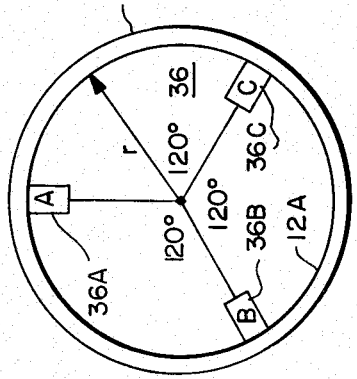

An alternative sensing array 36 is shown in FIGS. 10 and 11 as comprising three symmetrically spaced sensing wheels 36A, 36B and 36C adapted to be mounted on the transducer section 10B of the pig 10 by the same spring biased mounting arrangement as the sensing wheels 26A-D and 28A-D such that 120° of the circular cross-section of the pipeline 12 is subtended between each adjacent wheel pair.

In this arrangement, the curvature components $K_A$, $K_B$, $K_C$ in the respective planes of the sensing wheels 36A-C are as follows:

$$K_A = \frac{2A-B-C}{r(A+B+C)}$$
$$K_B = \frac{2B-A-C}{r(A+B+C)}$$

-Continued $$K_C = \frac{2C-A-B}{R(A+B+C)}$$

As before, A, B and C represent the distances travelled by the respective sensing wheels 36A-C through a given length of the pipeline 12.

The resultant curvature $K_R$ is then determined as follows:

$$K_R = \frac{2}{r(A+B+C)}\sqrt{A^2+B^2+C^2-AB-AC-BC}$$

From the foregoing relationship and the angle $\phi$ between the resultant curvature $K_R$ and for example, the curvature component $K_A$, it is possible to determine the angle $\phi$ and then the resultant curvature $K_R$ as a function of $\phi$ from any two of the curvature components, as follows:

$$\tan\phi = \frac{K_B + 0.5 K_A}{0.866 K_A}$$
and
$$K_R = \frac{K_A}{\cos\phi}$$

Once the resultant curvature $K_R$ is thus determined the true horizontal and vertical components can be determined thereby determining the angle $\theta$ between the component vector $K_A$ and the gravitational vector G as previously described with reference to FIG. 9, using the sine and cosine of the sum of the angles $\theta$ and $\phi$.

In both embodiments, a gravitational reference is preferably provided by a pendulum device or the like having an absolute position code readout for the position of the gravitational vector G relative to the orientation of the given sensing array 26, 28 or 36.

ESTABLISHMENT OF VERTICAL REFERENCE

Figure 12:
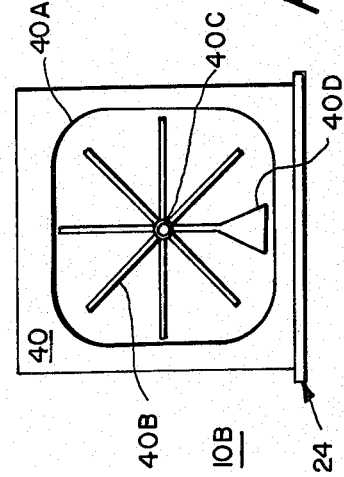
FIG. 12 is a front plan schematic of an encoded gravitational reference device of the present invention.
Figure 13:
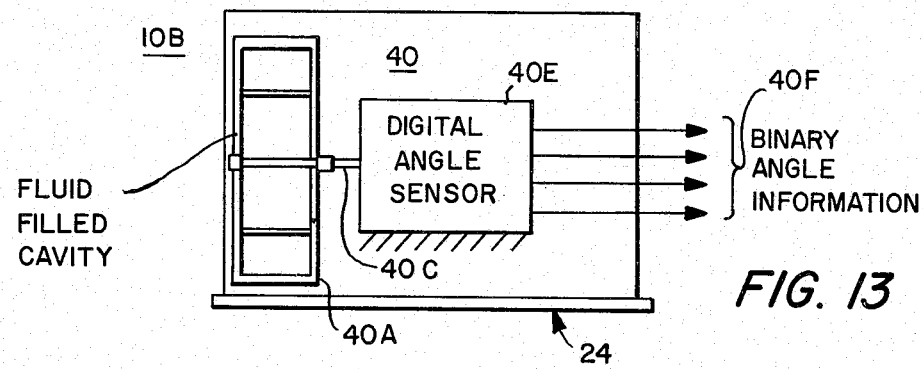
FIG. 13 is a side elevational schematic of the gravitational reference device of FIG. 12.

Such a vertical reference device, i.e., one which establishes the gravitational vector g and the angle $\theta$ required to compute the true horizontal and vertical curvature components $K_H$ and $K_V$, will now be described with reference FIGS. 12 and 13.

The gravitational sensor 40 comprises a fluid filled housing 40A, the fluid being for damping, with a paddle wheel 40B mounted therein integral with a rotating shaft 40C which extends outwardly of the housing 40A. A pendulous mass 40D is affixed to one vane of the paddle wheel 40B in the provision of a damped pendulum within the housing 40A.

The housing 40A is fixedly mounted on the instrument housing 24 of the transducer section 10B to provide a gravitational reference between the position assumed by the pendulous mass 40D and the sensing arrays 26 and 28 (or 36 if that embodiment is used) by reference to the rotational position of the output shaft 40C.

The position of the output shaft 40C is encoded by a directly coupled digital shaft encoder 40E which provides a binary coded angle read-out on its output leads 40F.

The shaft encoder 40E is also fixedly mounted in the instrument housing 24 of the transducer section 10B of the pig 10 to provide a zero reference position for the output shaft 40C.

Suitable shaft encoders 40E are commercially available and known in the art as previously described for the encoders 26A3-D3 and 28A3-D3.

GENERATION AND CORRELATION OF CODED DATA REPRESENTING SENSING WHEEL TRAVEL AND GRAVITATIONAL REFERENCE

Opposed Sensing Wheel Pair Embodiments

Referring first to FIG. 14, a first embodiment for the correlation of data from the orthogonal sensing arrays 26 and 28 will now be described, with specific reference to the generation and correlation of data for determination of the $K_{AB}$ and $K_{CD}$ components of the sensing array 26 by way of example.

The digital shaft encoders 26A3, 26B3, 26C3 and 26D3 are shown as having their output leads LA, LB, LC and LD connected, respectively, to counter inputs CA1, CB1, CC1 and CD1 of an up-counter CABCD which is set to provide an output signal on its output lead LABCD when the cumulative count registered therein has reached a number representative of a predetermined increment of travel along the pipeline 12. In the specific example shown in FIG. 14, this distance is chosen as four (4) feet of travel.

Simultaneously with the progress of the up-count in counter CABCD, individual counters CA, CB, CC, and CD have up-count inputs CA2, CB2, CC2 and CD2 resepctively, connected directly to the output leads LA, LB, LC and LD of the shaft encoders 26A3-26D3.

The data output leads LCA of the counter CA are directly connected to the input of a storage register SRA which stores the incremented count generated by the shaft encoder 26A3 as representative of the distance travelled by the sensing wheel 26A over the chosen increment of travel provided by the counter CABCD as will be more fully described hereinafter.

The data output leads LCB of the counter CB are directly connected to the input of a storage register SRB which stores the incremented count generated by the shaft encoder 26B3 as representative of the distance travelled by the sensing wheel 26B over the chosen increment of travel provided by the counter CABCD as will be more fully described hereinafter.

The data output leads LCC and LCD of the counters CC and CD are directly connected, respectively, to the inputs of storage registers SRC and SRD which respectively store the incremented counts generated by the shaft encoders 26C3 and 26D3 as representative of the distances travelled by the sensing wheels 26C and 26D over the chosen increment of travel provided by the counter CABCD as will be more fully described hereinafter.

The individual wheel rotation counters CA, CB, CC and CD have respective reset inputs RA, RB, RC and RD which are directly conneted to the output LABCD of the increment counter CABCD.

The wheel rotation count storage registers SRA, SRB, SRC and SRD have respective control inputs SA, SB, SC and SD which are directly connected to the output LABCD of the increment counter CABCD.

Thus, for each predetermined increment of travel the array of sensing wheels 26A, 26B, 26C and 26D the increment counter CABCD generates a pulse on the output LABCD which acts as a reset pulse to the wheel rotation counters CA, CB, CC and CD via their respective reset inputs RA, RB, RC and RD and also acts as a control pulse to the control inputs SA, SB, SC and SD to produce an output of the contents of the wheel count storage registers SRA, SRB, SRC and SRD through outputs LSA, LSB, LSC and LSD, the said contents comprising a binary code to be applied to the inputs MRA, MRB, MRC and MRD of a suitable recording means such as a magnetic tape recorder MR contained in the instrument section 10C of the pig 10.

The orientation data of the gravity vector G is also applied to the input MRG of the magnetic recorder MR from an output LSG of a storage register SRG having as its data input the output leads 40F of the shaft position encoder 40E of the gravitational sensor 40. A control terminal SG is provided in direct connection with the output LABCD of the increment counter CABCD to output a gravitational vector position code to the input terminal MRG of the magnetic recorder MR at the completion of each predetermined increment of travel detected by the increment counter CABCD, in synchronism with the coded counts from the wheel count registers SRA, SRB, SRC and SRD.

Thus, for each selected increment of travel along the pipeline 12 by the pig 10 and sensing wheels 26A-D, the respective distance counts A-D and the relative angular position of the gravitational vector G to the sensing array 26 are recorded in the magnetic recorder MR. thereby providing the required data for solving the curvature equations previously described.

The increment counter CABCD can also accept the inputs from all four of the digital encoders 26A3-D3 and average the counts therefrom to approximate 4feet of axial travel of the pig 10 in the pipeline 12 as opposed to detection of a cumulative count which is representative of a four (4) foot distance traversed by the array of wheels 26A-D along the inner wall 12A of the pipeline 12. This can be accomplished by known methods of summing and dividing by four (4) until the resultant count achieves that number representative of 4feet of travel.

Figure 15:
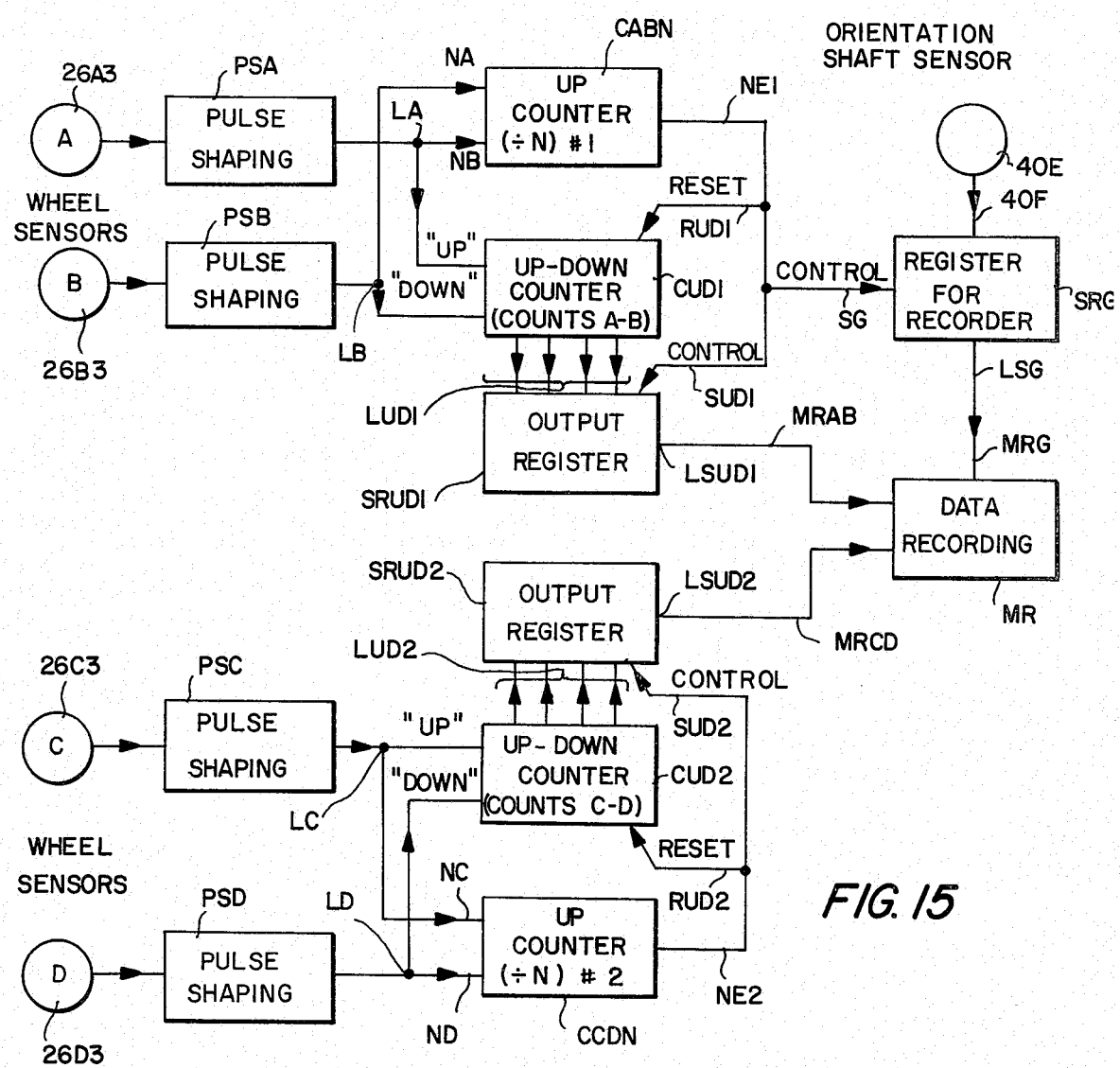
FIG. 15 is a schematic of a second embodiment of a curvature sensing transducer and recording means of the present invention with a normalizing means providing direct readout of vector components of detected curvature.

Providing Direct Readout of Curvature Components $K_{AB}$ and $K_{CD}$ in A Sensing Array:

Referring to FIGS. 1, 6 and 15, a system shown in the latter for providing a count directly representative of curvature or curvature multiplied by a power of ten will now be described.

From the relationship:

$K_{AB} = A - B/r(A+B)$ it becomes apparent that since the pipeline radius "$r$" is a constant for a given size pipeline 12 being monitored by the pig 10 and if the quantity $r(A+B)$ is unity or a power of ten (10), then the quantity (A-B) will be a direct reading a curvature in radians/ft.

For example if $r = 2$ feet, and A+B = 5 feet, then A − B = $K_{AB} \times 10$.

Further, (A-B) is readily generated by an updown counter means CUD1 which counts "UP" the output LA and counts "DOWN" the output LB of the wheel encoders 26A3 and 26B3, or vice versa.

By way of further example, consider a pipeline 12 having a radius $r=0.5$ ft. and (A+B) is constrained to a repetitive increment of 2000 counts by a count and divide device CABN, i.e., a "divide by N" counter, where N is any selected number.

Since A+B/2 is the average distance travelled by the sensing wheels 26A and 26B along the pipeline 12, then N = 2 and the qantity A−B = $K_{AB}$ × 1,000.

Now, if the wheel encoders 26A3 and 26B3 are set to give 5000 counts/ft. each and the "divide by N" counter CABN counts the function "A or B", a count of 2000(A+B = 0.4 ft.) divided by N = 2 will result in an output pulse of the counter CABN for every 0.2 ft. of travel of the pig 10 in the pipeline 12, independent of pig speed or direction of travel.

As shown in FIG. 15, for the $K_{AB}$ components of curvature, the wheel encoders 26A3 and 26B3 output through pulse shapers PSA and PSB to their respective output terminals LA and LB previously described in FIG. 14.

The encoder outputs LA and LB drive the inputs NA and NB respectively, of the "divide by N" counter CABN, which has an output NE1 on which a control pulse appears for each preselected incremental count, such as the count of 1,000 in the previous example. Thus, for each predetermined count a given increment of travel along the pipeline 12 can be monitored for a direct readout of the curvature component $K_{AB}$ together with the position code of the gravitational reference vector G, as will now be described.

The up-down counter CUD1 determines the difference between the counts A and B and in the embodiment shown counts "UP" for the LA output and "DOWN" for the LB output of the respective wheel encoders 26A3 and 26B3, via the "UP" and "DOWN" inputs shown. The resultant count representing the magnitude of the function (A−B) is transmitted through the output leads LUD1 of the up-down counter CUD1 into an output storage register SRUD1, the latter having an output LSUD1 which is directly connected to an input MRAB Of the magnetic recorder MR to provide the latter with the encoded representation of $K_{AB}$ at regular intervals of distance traversed by the pig 10 in the pipeline 12, i.e., at regular axial increments of traverse by the sensing array 26.

The control of the output of the register SRUD1 is achieved by connecting the control input SUD1 of the latter to the output NE1 of the "divide by N" counter CABN, which constrains the register SRUD1 to output its coded content to the magnetic recorder MR at the completion of the predetermined increments of travel represented by each output signal at the output NE1. The output NE1 also resets the up-down counter CUD1 by direct connection to its reset terminal RUD1.

For the $K_{CD}$ components of curvature, the wheel encoders 26C3 and 26D3 output through pulse shapers PSC and PSD to their respective output terminals LC and LD previously described in FIG. 14.

The encoder outputs LC and LD drive the inputs NC and ND respectively, of the "divide by N" counter CCDN, which has an output NE2 on which a control pulse appears for each preselected incremental count, such as the count of 1000 in the previous example. Thus, for each predetermined count a given increment of travel along the pipeline 12 can be monitored for a direct readout of the curvature component $K_{CD}$ together with the position code of the gravitational reference vector G, as will now be described The up-down counter CUD2 determines the difference between the counts C and D and in the embodiment shown counts "UP" for the LC output and "down" for the LD output of the respective wheel encoders 26D3 and 26C3, via the "UP" and "DOWN" inputs shown. The resultant count representing the magnitude of the function (C-D) is transmitted through the output leads LUD2 of the up-down counter CUD2 into an output storage register SRUD2, the latter having an output LSUD2 which is directly connected to an input MRCD Of the magnetic recorder MR to provide the latter with the encoded representation of $K_{CD}$ at regular intervals of distance traversed by the pig 10 in the pipeline 12, i.e., at regular axial increments of traverse by the sensing array 26.

The control of the output of the register SRUD2 is achieved by connecting the control input SUD2 of the latter to the output NE2 of the "divide by N" counter CCDN, which constrains the register SRUD2 to output its coded content to the magnetic recorder MR at the completion of the predetermined increments of travel represented by each output signal at the output NE2. The output NE2 also resets the up-down counter CUD2 by direct connection to its reset terminal RUD2.

The gravitational reference encoder 40E via its output 40F drives a storage register SRG which has a control terminal SG connected to the "divide by N" counter CABN output NE1 to provide a gravitational reference code via output terminal LSG Of the register SRG to an input terminal MRG Of the magnetic recorder MR in synchronism with the end of each increment of travel.

The "divide by N" counter CABN can also count the function "A or B or C or D" with N = 4 and a separate up-down counter CUD and accompanying storage register SRUD provided for the signals from each of the sensing wheel pairs 26A-26B and 26C-26D and their respective encoders 26A3-26B3 and 26C3-26D3. Both of the storage registers SRUD would then be controlled by the output NE1 of the "divide by N" counter CABN to drive the inputs MRAB and MRCD of the magnetic recorder MR when the preset increment of travel is achieved.

The Three Wheel Sensing array System

Figure 16:
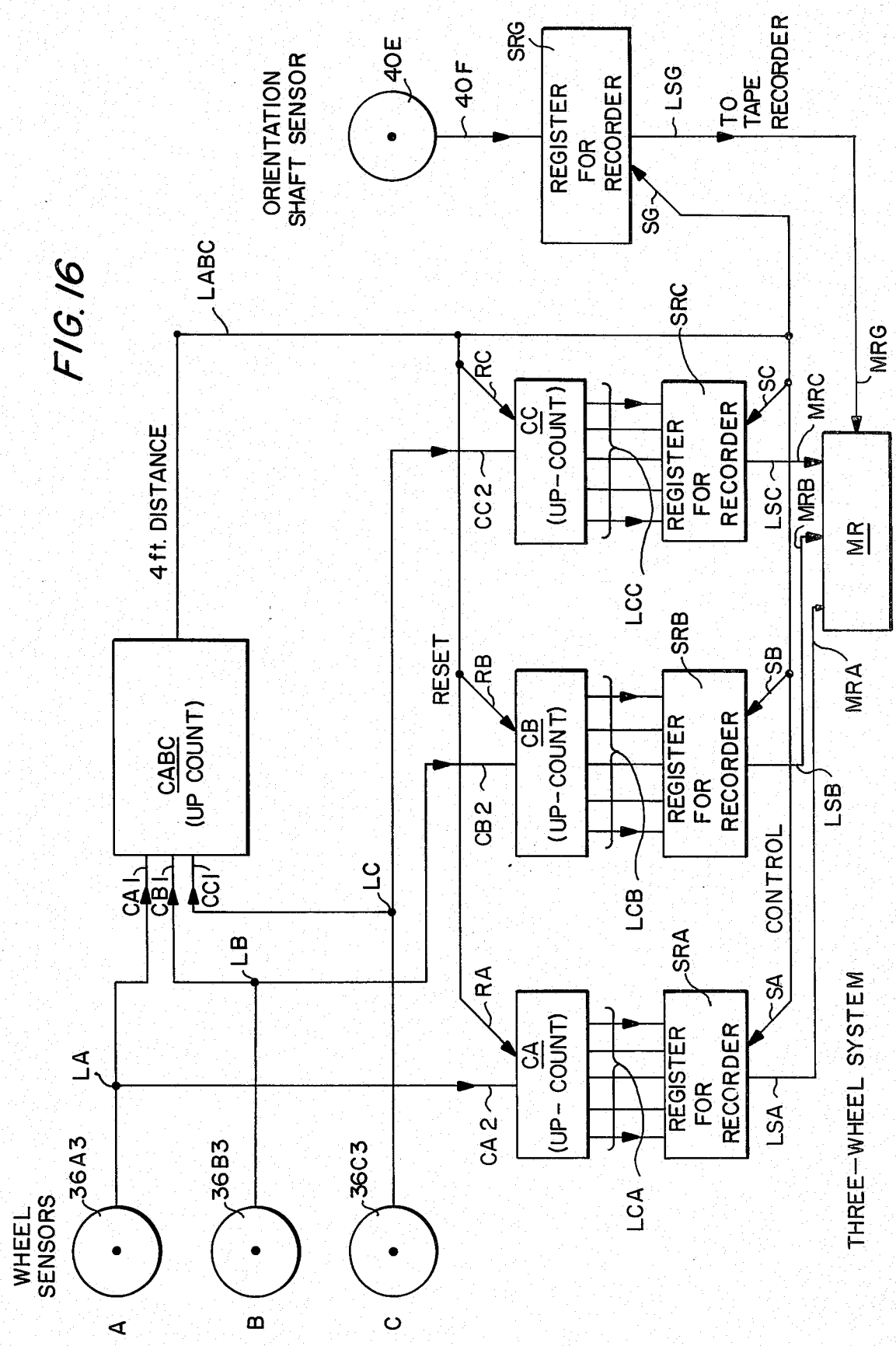
FIG. 16 is a schematic of a third embodiment of a curvature sensing transducer and recording means of the present invention.

Referring to FIGS. 10, 11 and 16, a system for encoding data from the three wheel sensing array 36 will now be described.

In FIG. 16, the sensing wheel encoders 36A3, 36B3 and 36C3 for the sensing wheels 36A, 36B and 36C, respectively, are shown as having output terminals LA, LB and LC directly connected to inputs CA1, CB1 and CC1, respectively of counter CABC which either averages the individual sensing wheel distance counts A, B and C or determines which of the said sensing wheel counts A, B and C first reaches a predetermined distance of travel. For example, 4 feet of travel along the inner surface 12A of the pipeline 12 by any one of the wheels 36A-C or the average of the three distances being 4 feet would cause the counter CABC to generate an output on its output lead LABC, depending upon the constraint selected.

The output lead LABC is directly connected to the reset terminals RA, RB and RC of distance pulse counters CA, CB and CC, respectively, which respectively have inputs CA2, CB2 and CC2 directly connected to the outputs LA, LB and LC, respectively of the sensing wheel encoders 36A3, 36B3 and 36C3.

The distance pulse counters CA, CB and CC have respective output leads LCA, LCB and LCC driving storage registers SRA, SRB and SRC, respectively, to store the generated counts from the wheel encoders 36A3, 36B3 and 36C3 throughout one increment of travel.

Control terminals SA, SB and SC are respectively provided for the storage registers SRA, SRB and SRC and are directly connected to the output LABC of the increment counter CABC to cause the said registers to output via respective output leads LSA, LSB and LSC directly to the respectively associated input terminals MRA, MRB and MRC of the magnetic recorder MR In response to the appearance of an output pulse on the output LABC of the said increment counter CABC.

As in the previous embodiments the increment output LABC is connected to the control terminal SG of the gravitational reference vector storage register SRG to cause it to output stored gravitational reference data through the output lead LSG to the input MRG Of the magnetic recorder MR at the completion of a given increment of travel.

Thus, the distance counts A, B and C and the gravitational reference angle $\theta$ are encoded and stored in the magnetic recorder MR for each predetermined increment of travel of the pig 10 and the sensing array 36 along the pipeline 12.

Here, as in the previous embodiments, all of the necessary parameters are now encoded and stored for subsequent processing to analyze each incremental length of pipeline traversed and scanned by the pig 10 for the determination of curvatures in excess of a predetermined safe limit and the substantially exact location of such excess curvatures.

As a more detailed example of the system of FIG. 15 reference is now made to FIG. 15A in which commercially available circuit components, similar to those usable in the various embodiments of FIGS. 14, 15 and 16 are utilized.

The pulse shapers PSA and PSB for the sensing encoders 26A3 and 26B3 respectively comprise input OR gates PSA1 and PSB1 coupled to the encoder outputs driving respectively associated one shot multivibrator circuits PSA2 and PSB2, the outputs of the latter comprising the outputs LA and LB as previously described for the sensing encoders 26A3 and 26B3, respectively.

The outputs LA and LB are connected to the inputs NA and NB, respectively of the "divide by N" counter CABN, these inputs driving an input gate CABN1 having its output NAB driving a plurality of counter modules CABN2, CABN3, CABN4 and CABN5 interconnected to count the function (A+B)/N. The output terminal NE1 of the "divide by N" counter CABN is the output of the last counter module CABN5 and is connected to the input terminal S1 of a one-shot multivibrator S having output terminals S2 and S3.

The output terminal S2 is directly connected to the common terminal SUD of the count storage register SRUD, the latter comprising three modules SRUDX, SRUDY, and SRUDZ of the up-down counter CUD.

The output terminal S3 of the one-shot multivibrator S is connected to an input terminal R1 of another one-shot multivibrator R, the latter having an output terminal R2 which is directly connected to the common reset terminal RUD of the up-down counter CUD.

The modules CUDX, CUDY and CUDZ are connected in cascade with first module CUDX having UP and DOWN inputs connected to the outputs LA and LB, respectively of the sensing encoders 26B3 and 26A3.

As previously described with reference to FIG. 15, when the predetermined incremental count creates a pulse on the output NE1, the multivibrator S is triggered via its input S1 and the output S2 thereof drives the control terminal SUD of the storage registers SRUD to output the stored count through the output leads LSUD of the latter into the input terminal MRAB of the tape recorder MR to load the recorder with the encoded count representing the curvature component $K_{AB}$.

Substantially simultaneously, the output S3 of the multivibrator S drives the input R1 of the next multivibrator R, generating a reset pulse on the output R2 thereof which resets the up-down counter CUD via the reset terminal RUD.

At this point in time, the incremented counting cycle commences again and repeats in this manner until, referring to FIG. 1, motion of the pig 10 through the pipe 12 ceases, causing the sensing wheels 26A-D and their respective encoders 26A3-D3 to cease transmitting data.

The magnetic recorder MR is shown as having input MRG for the gravitational vector G reference input code.

The pulse shapers PSC and PSD for the sensing encoders 26C3 and 26D3 respectively comprise input OR gates PSC1 and PSD1 coupled to the encoder outputs driving respectively associated one shot multivibrator circuits PSC2 and PSD2, the outputs of the latter comprising the outputs LC and LD as previously described for the sensing encoders 26C3 and 26D3, respectively.

The outputs LC and LD are connected to the inputs NC and ND, respectively of the "divide by N" counter CCDN, these inputs driving an input gate CCDN1 having its output NCD driving a plurality of counter modules CCDN2, CCDN3, CCDN4 and CCDN5 interconnected to count the function (C+D)/N. The output terminal NE2 of the "divide by N" counter CCDN is the output of the last counter module CCDN5 and is connected to the input terminal S1' of a one-shot multivibrator S' having output terminals S2' and S3'.

The output terminal S2' is directly connected to the common terminal SUD' of the count storage register SRUD', the latter comprising three modules SRUDX', SRUDY', and SRUDZ' of the up-down counter CUD'.

The output terminal S3' of the one-shot multivibrator S' is connected to an input terminal R1' of another oneshot multivibrator R', the latter having an output terminal R2' which is directly connected to the common reset terminal RUD' of the up-down counter CUD'.

The modules CUDX', CUDY' and CUDZ' are connected in cascade with first module CUDX' having UP and DOWN inputs connected to the outputs LC and LD, respectively of the sensing encoders 26D3 and 26C3.

As previously described with reference to FIG. 15, when the predetermined incremental count creates a pulse on the output NE2, the multivibrator S' is triggered via its input S1' and the output S2' thereof drives the control terminal SUD' of the storage registers SRUD' to output the stored count through the output leads LSUD' of the latter into the input terminal MRCD of the tape recorder MR to load the recorder with the encoded count representing the curvature component $K_{CD}$.

Substantially simultaneously, the output S3' of the multivibrator S' drives the input R1' of the next multivibrator R', generating a reset pulse on the output R2' thereof which resets the up-down counter CUD' via the reset terminal RUD'.

At this point in time, the incremented counting cycle commences again and repeats in this manner until, referring to FIG. 1, motion of the pig 10 through the pipe 12 ceases, causing the sensing wheels 26A-D and their respective encoders 26A3-D3 to cease transmitting data.

The commercial availability of the elements of the embodiment of FIG. 15A is illustrated as follows:

| Element | Commercial Designation | Source |
|---|---|---|
| One-shot multivibrators PSA2, PSB2, S and R, PSC7, PSD2, S' and R' | UL 9601 | Fairchild |
| Input Gates PSA1, PSB1, CABN1, PSC1 PSD1, CCDN1 | SN 7486 | Texas Instruments |
| Counters CABN2 through CABN5 and CCDN2 through CCDN5 | SN 7490 | Texas Instruments |
| Up-Down Counters CUDX through CUDZ and their primes | SN 74192 | Texas Instruments |
| Storage Registers SRUDX through SRUDZ and their primes | SN 7475 | Texas Instruments |

PROCESSING THE ENCODED DATA

When a pipeline run of the pig 10 results in a coded tape from the magnetic recorder MR in which all of the curvatures detected for each increment of the run are within prescribed acceptable limits, a computer storage of that tape at a desired data processing location can be made for use as an acceptable pipeline profile for that specific run.

A subsequent run of the pig 10 through the pipeline then is conducted and a record of detected curvature measurements is made on a second magnetic tape. The records on the two tapes are then compared against each other with the aid of a computer, for example, and deviation in curvature is detected by a programmed comparison process in the computer to determine if any curvatures detected in the subsequent run exceed programmed limits of deviation, then the computer is programmed to identify the location in the pipeline wherein that deviation limit has been exceeded. The computer may also be programmed to read out the value and direction of curvature as solutions to the previously defined equations for resultant curvature $K_R$.

In recording the encoded data in the recorder MR in the various systems of FIGS. 1, 14, 15 and 16, the data is multiplexed by known methods onto the recording tape in assigned recording tracks.

At a end of the run, the tape is removed from the recorder MR In the instrument housing 30 of the instrument section 10C of the pig 10. Then the data thereon is demultiplexed and transferred to a scratch tape by the central computer in a form suitable for further processing by the computer, i.e., re-encoded to be compatible with the computer logic.

From this scratch tape, the computer will calculate the magnitude and incremental locations of the pipeline curvatures sensed by the sensing arrays 26 and/or 28 or 36 on the pig 10. These magnitudes and locations will then be permanently recorded on a memory tape or the like at the computer.

Such a permanent record, made immediately subsequent to the final construction of a given pipeline run (section of pipeline) will then comprise a reference standard of accepted curvature vs. location along that run of pipeline.

Subsequently collected run data will be similarly treated and a permanent memory record made for comparison, increment by increment of the run, with the memory record of the initial condition curvature and location data.

Comparisons of the magnitudes of curvature at each incremental location which show curvature changes in excess of a predetermined allowable deviation will be identified in the computer printout.

This will permit service crews and/or equipment to be sent to the identified locations for substantially immediate corrective maintenance.

USE OF MULTIPLE SENSING ARRAYS ARE EMPLOYED,

Where two or more sensing arrays such as (26 and 28) shown in FIGS. 1 and 2, the distance data of each of the sensing wheels must be encoded and recorded.

The positional code for the gravitational reference vector G (FIG. 9) is a common reference for both sensing arrays although the reference angle $\theta$ for each array may differ.

The sensing arrays can be mounted on independent transducer sections coupled by universal joints similar to the joints 14A and 14B of FIG. 1, if desired.

With monitored increments of travel maintained at a distance compatible with the rotational stability of the pig 10 in the pipeline 12, the monitoring of the gravitational vector reference angle $\theta$ by an absolute position code output at the termination of each increment of travel will maintain optimum accuracy of gravitational reference magnitude and direction of curvature over that increment.

The use of multiple sensing arrays 26, 28, 36 and multiple orientation arrays 32 and 34 will substantially preclude rotation of the transducer section 10B and instrument section 10C ion the pipeline 12.

The three wheel sensing array 36 previously described with reference to FIGS. 10, 11 and 16 can be used in multiples like the orthogonally disposed opposed wheel pair arrays 26 and 28, either on the common tranducer section 10B of the pig 10 or on separate transducer sections linked by a suitable universal joint.

In all of the foregoing embodiments, the use of universal joints between the sections of the pig 10 are to permit traverse of the pig through standard radius bends of the pipeline 12.

COMPENSATING BY A MULTIPLICITY OF SENSING WHEELS FOR NON-CIRCULARITIES OF PIPE CROSS-SECTIONS

A multiplicity of sensing wheels can be used to determine the non-circularity of the cross section of a pipe and take into account this non-circularity when computing the pipeline curvature.

Figures 17, 18:
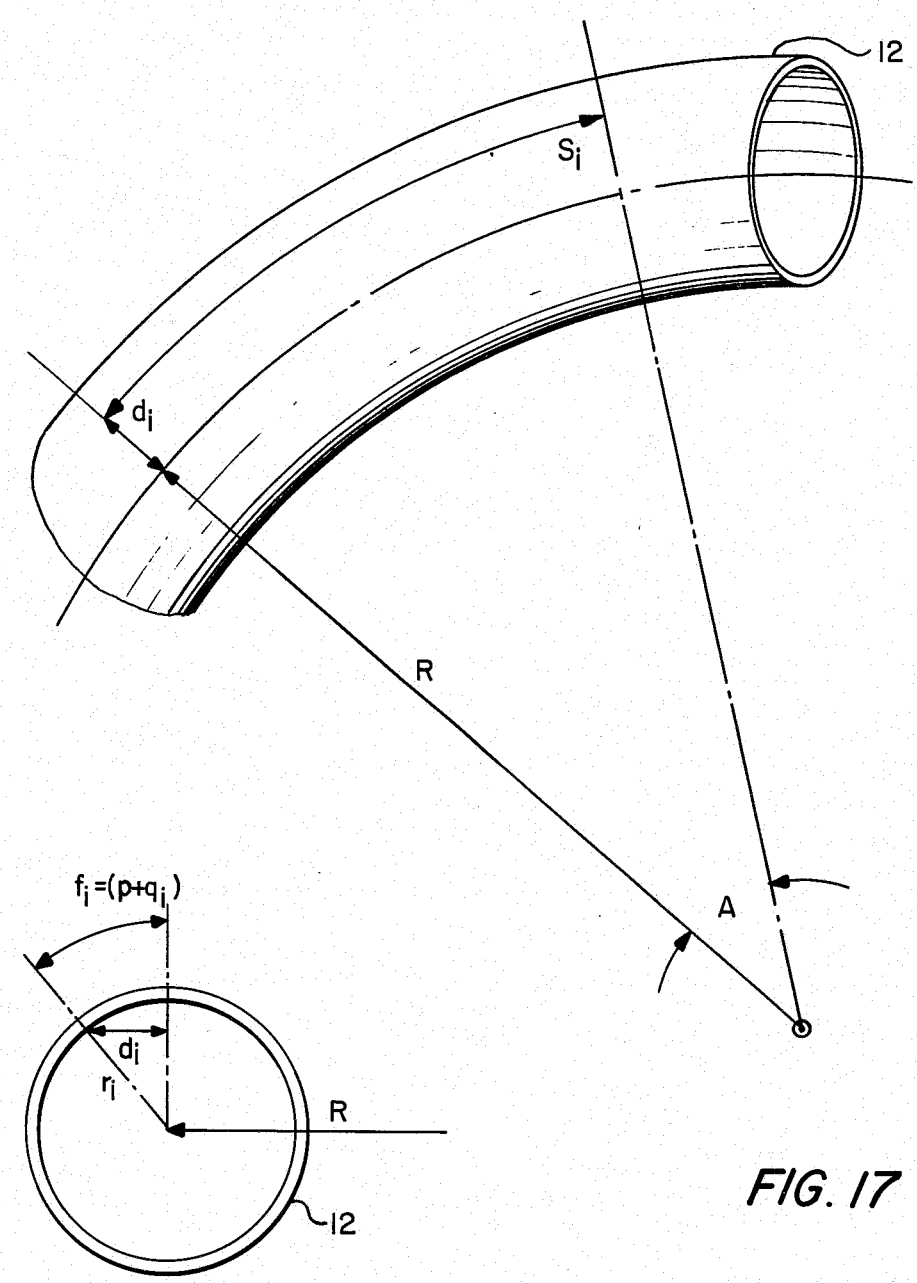
FIGS. 17 and 18 are related schematics illustrating the physical parameters considered for pipes of non-circular cross-section.

Referring to FIGS. 17 and 18, the following relationships become apparent:

The distance $S_i$ travelled by a sensing wheel along a path on a curved pipe section 12 is $$S_i = R \cdot (1 + d_i/R) \cdot A$$

wherein

R = radius of curvature of the pipe section 12;

$d_i$ = incremental distance from the curvature center of the pipe section 12 to the center of the pipe cross-section; and A = angular distance travelled by the sensing wheel along the pipe section in radians.

For a multiplicity of sensing wheels, the distances $S_1$-----$S_i$ (where i is the number of sensing wheels) travelled by each is as follows:

$$S_1 = R \cdot (1 + d_1/R) \cdot A$$
$$S_2 = R \cdot (1 + d_2/R) \cdot A$$
$$S_3 = R \cdot (1 + d_3/R) \cdot A$$
,
,
,
$$S_i = R \cdot (1 + d_i/R) \cdot A$$

where the various distances $S_1$-----$S_i$ or relative distances $S_1/A$ ----$S_i/A$ are known (measured by the sensing wheels) and the value of the radius of curvature R is sought.

The incremental distances $d_1$----$d_i$ are defined as follows:

$$d_i = r_i \sin f_i$$

where $r_i$ = the distance of the track of a given $i^{th}$ sensing wheel from the center of the crosssection of the pipe 12; and $f_i$ = the angle between a given $r_i$ and the vertical to the plane of curvature of the pipe 12.

With the sensing wheels mounted in a known array, i.e., with fixed relative angles, then:

$$f_i = p + q_i$$

where p = angle between an instrument reference (gravity vertical) and the vertical to the plane of curvature of the pipe 12; and $q_i$ = known angle between a given $i^{th}$ sensing wheel and the said instrument reference.

Therefore, combining the two foregoing equations results in:

$$d_i = r_i \sin (p+q_i)$$

where the $q_i$'s are known.

If, for the sake of example, an elliptical crosssection is assumed for the pipe section 12, then in polar coordinates the following relationships apply:

$$(b^2 - a^2) \cdot \sin (p+q_i+u) + a^2 = a^2 b^2/r_i^2$$

where a = length of the major axis of the ellipse;

b = length of the minor axis of the ellipse;

u = angle between the major axis of the ellipse to the vertical to the plane of curvature of the pipe 12; and p, $q_i$ and $r_i$ have been previously defined.

Since the $i^{th}$ sensing wheel moving along a path corresponding to the $i^{th}$ point on the cross-section of the pipe 12 has been defined as:

$$S_i = R(1 + d_i/R) \cdot A = (R + d_i) \cdot A = [R + r_i \sin (p+q_i)] \cdot A,$$

this equation combined with the equation of the ellipse, for the $i^{th}$ sensing wheel, results in: $(S_i - A \cdot R)^2 [b^2 - a^2) \cdot \sin (p+q_i+u) + a^2] = A^2 \cdot a^2 \cdot b^2 \cdot \sin^2 (p+q_i)$ where the value of R is sought (to determine the curvature 1/R), the values of a, b, u, A and p are also unknown and the values of $S_i$ and $q_i$ are measured by the sensing wheels and the gravitational instrument reference.

Thus with i = 6, i.e., with an array of six (6) sensing wheels, six equations for the six unknowns (R, a, b, u, A and p) can be established.

It is well known, and suitable mathematical iterative algorithms for general purpose computers are available (e.g. Introductory Computer Methods and Numerical Analysis, Ralph H. Pennington, McMillan 1970, second edition, chapter 8; Survey of Numerical Analysis, Todd, McGraw-Hill, 1962), for determining the six unknowns from six independent equations of the above type, each such equation containing measurements made with a distinct one of the sensing wheels.

The data generated and recorded from such an array of N sensing wheels is then handled as previously described herein to effect curvature profiles of a given length of pipeline 12.

What is claimed:

1. Transducer means for generating and retaining data representative of the curvature of a pipe section along a path that includes a given cross-sectional diameter thereof comprising:

first and second sensing wheels of known proportions supported in rolling contact with the inner walls of said pipe section at opposite ends of said given diameter;

means for moving said sensing wheels through said pipe section to cause said sensing wheels to roll along said inner walls in a plane defined by said given diameter and the longitudinal axis of said pipe section;

encoder means for generating data signals representative of the distance travelled by each said sensing wheel along a predetermined finite length of said pipe section; and recording means for receiving and retaining said data signals for subsequent calculation.

2. The invention defined in claim 1, wherein said encoder means comprises:

first and second wheel encoder means for providing data signals representative of the distance travelled by said first and second sensing wheels respectively;

first counter means responsive to said data signals for providing a control output signal representative of a selected incremental distance traversed by said sensing wheels along said pipe section; and second counter means responsive to said data signals for generating first and second counts representative of the respective distances travelled along said inner wall of said pipe by said first and second sensing wheels and for transmitting said counts to said recording means;

said second counter means including reset means responsive to said control signal of said first counter means to reset said second counter means at the completion of each said incremental distance.

3. The invention defined in claim 1, wherein said encoder means comprises:

first and second wheel encoder means for providing distance output signals representing respective quantities A and B as a function of the respective distances travelled by said first and second sensing wheels;

first signal encoding means for summing the quantities A and B and providing a control output signal representative of a preselected magnitude of said sum thereby functionally defining a predetermined incremented distance traversed by said sensing wheels axially of said pipe; and second signal encoding means responsive to said distance signals for generating first and second counts representative of the quantities A and B, respectively, and for transmitting same to said recorder means;

said second signal encoding means including reset means responsive to said control signal to reset said second signal encoding means at the termination of each said incremental distance traversed by said sensing wheels.

4. The invention defined in claim 1, wherein said pipe section has a cross-sectional radius $r$; and wherein said encoder means comprises:

first and second wheel encoder means providing distance output signals representing the respective quantities A and B as a function of the respective distances travelled by said first and second sensing wheels;

first signal encoding means responsive to said distance signals for deriving the function $r(A+B)$ and for providing a control output signal when said function equals a predetermined power of ten; and second signal encoding means responsive to said distance signals for deriving the function $(A-B)$ and for transmitting same to said recorder means;

said second signal encoding means including reset means responsive to said control signal to reset said second signal encoding means upon the occurrence of said control signal; whereby, upon the occurrence of said control signal the quantity $(A-B)$ comprises a direct readout of curvature of said pipe over an incremental distance of travel of said sensing wheels axially of said pipe between the occurrence of successive control signals from said first signal encoding means.

5. The invention defined in claim 1, wherein said pipe section has a cross-sectional radius $r$; and wherein said encoder means comprises:

first signal encoding means responsive to said distance signals for deriving the function $r(A+B) \div N$, where N is any number selected to produce a predetermined average incremental distance of travel of said sensing wheels axially of said pipe when the function $r(A+B) \div N$ equals a predetermined power of ten, and said first signal encoding means providing a control output signal when said function equals said predetermined power of ten; and second signal encoding means responsive to said distance signals for deriving the function $(A-B)$ and for transmitting same to said recording means;

said second signal encoding means including reset means responsive to said control signal to reset said second signal encoding means upon the occurrence of said control signal; whereby, upon each said occurrence of said control signal the quantity $(A-B)$ comprises a direct readout of curvature of said pipe over said predetermined average incremental distance.

6. Transducer means for generating and retaining data representative of the magnitude and direction of curvature of a pipe section at predetermined increments of axial length thereof, comprising:

at least one sensing array of at least three sensing wheels symmetrically disposed about the longitudinal axis of said pipe in a cross-sectional plane perpendicular to said axis and in rolling contact with the inner wall of said pipe section;

means moving said sensing array through said pipe section to cause said sensing wheels to roll along said inner wall in respective axial planes of said pipe section;

encoder means for generating counts representative of the distance travelled by each said sensing wheel along a predetermined incremental length of said pipe section; and recording means for receiving and retaining said counts for subsequent calculation.

7. Transducer means for generating and retaining data representative of the magnitude and direction of curvature of a pipe section at predetermined increments of axial length thereof, comprising:

at least one sensing array of at least three sensing wheels symmetrically disposed about the longitudinal axis of said pipe in a cross-sectional plane perpendicular to said axis and in rolling contact with the inner wall of said pipe section;

means for moving said sensing array through said pipe section to cause said sensing wheels to roll along said inner wall in respective axial planes of said pipe section;

wheel encoding means for providing distance output signals representative of the distance travelled by each of said sensing wheels along said inner wall;

control means responsive to said distance signals for providing a control output signal upon the occurence of each predetermined incremental distance of travel of said sensing array axially of said pipe;

counting means responsive to said distance signals for generating a count for each said sensing wheels representative of the actual distance travelled thereby over the incremental axial distance of travel of said sensing array;

said counting means including reset means responsive to said control signal to reset said counting means at the occurrence of each predetermined increment of travel of said sensing array; and recorder means receiving said counts from said counting means and responsive to said control signal to provide a record of curvature parameters for each predetermined incremental distance along a given length of pipe.

8. The invention defined in claim 7, wherein said control means comprises averaging means for deriving the average distance of travel of all said sensing wheels to determine said predetermined incremental distance of travel of said sensing array axially of said pipe.

9. The invention defined in claim 7, wherein said recorder means comprises storage register means for receiving, accumulating and encoding said counts from said counting means; and magnetic tape recording means for recording said encoded counts in said register means;

said register means being responsive to said control signal to transmit said accumulated and encoded counts to said magnetic tape recording means at the conclusion of each predetermined increment of travel of said sensing array to provide in said magnetic tape recording means a recorded profile of curvature parameters for each incremental distance traversed along the axis of said pipe section by said sensing array.

10. Transducer means for generating and retaining data representative of the magnitude and direction of curvature of a pipe section at predetermined increments of axial length thereof, comprising:
- at least one sensing array of two orthogonally disposed pairs of sensing wheels symmetrically disposed about the longitudinal axis of said pipe in a cross-sectional plane perpendicular to said axis and in rolling contact with the inner wall of said pipe section;
- means for moving said sensing array through said pipe section to cause said sensing wheels to roll along said inner wall in respective axial planes of said pipe section;
- wheel encoding means providing distance output signals representative of the distance travelled by each of said sensing wheels along said inner wall;
- control means responsive to said distance signals for providing a control output signal upon the occurrence of each predetermined incremental distance of travel of said sensing array axially of said pipe;
- counting means responsive to said distance signals for generating a count for each said sensing wheel representative of the actual distance travelled thereby over the incremental axial distance of travel of said sensing array;
- said counting means including reset means responsive to said control signal to reset said counting means at the occurrence of each predetermined increment of travel of said sensing array; and
- recorder means receiving said counts from said counting means and responsive to said control signal for recording the magnitude of said counts upon each occurrence of a said control signal to provide a record of curvature parameters for each predetermined incremental distance along a given length of pipe.

11. The invention defined in claim 10, wherein said recorder means comprises storage register means for receiving, accumulating and encoding said counts from said counting means; and magnetic tape recording means for recording said encoded counts in said register means;
- said register means being responsive to said control signal to transmit said accumulated and encoded counts to said magnetic tape recording means at the conclusion of each predetermined increment of travel of said sensing array to provide in said magnetic tape recording means a recorded profile of curvature parameters for each incremental distance traversed along the axis of said pipe section by said sensing array.

12. Transducer means for generating and retaining data representative of the magnitude and direction of curvature of a pipe section at predetermined increments of axial length thereof, comprising:
- at least one sensing array of two orthogonally disposed pairs of sensing wheels symmetrically disposed about the longitudinal axis of said pipe in a cross-sectional plane perpendicular to said axis and in rolling contact with the inner wall of said pipe section;
- means for moving said sensing array through said pipe section to cause said sensing wheels to roll along said inner wall in respective axial planes of said pipe section;
- first, second, third and fourth wheel encoding means providing distance output signals representative of the quantities A, B, C and D as a function of the respective distances travelled by the first, second, third and fourth sensing wheels along said inner wall, said first and second wheels comprising the first and said third and fourth wheels comprising the second of said orthogonally disposed pairs of wheels;
- control means for summing the quantities A, B, C and D and providing a control output signal representative of a predetermined magnitude of said sum and thereby functionally defining said predetermined axial increment traversed by said sensing array;
- counting means for providing encoded counts representative of said quantities A, B, C and D;
- said counting means including reset means responsive to said control signal to reset said counting means at the occurrence of each predetermined axial increment; and
- recorder means receiving said counts from said counting means and responsive to said control signal for recording the magnitude of said counts to provide a record of the quantities A, B, C and D as the parameters of magnitude and direction of curvature of said pipe section for each predetermined axial increment along a given length of said pipe section.

13. The invention defined in claim 12, wherein said recorder means comprises storage register means for receiving, accumulating and encoding said counts from said counting means; and magnetic tape recording means for recording said encoded counts in said register means;
- said register means being responsive to said control signal to transmit said accumulated and encoded counts to said magnetic tape recording means at the conclusion of each predetermined increment of travel of said sensing array to provide in said magnetic tape recording means a recorded profile of curvature parameters for each incremental distance traversed along the axis of said pipe section by said sensing array.

14. Transducer means for generating and retaining data representative of the magnitude and direction of curvature of a pipe section at predetermined increments of axial length thereof, comprising:
- at least one sensing array of two orthogonally disposed pairs of sensing wheels symmetrically disposed about the longitudinal axis of said pipe in a cross-sectional plane perpendicular to said axis and in rolling contact with the inner wall of said pipe section;
- means for moving said sensing array through said pipe section to cause said sensing wheels to roll along said inner wall in respective axial planes of said pipe section;
- first, second, third and fourth wheel encoding means for providing distance output signals representative of the quantities A, B, C and D as a function of the respective distances travelled by the first, second, third and fourth sensing wheels along said inner wall, said first and second wheels comprising the first pair and said third and fourth wheels comprising the second pair of said orthogonally disposed pairs of wheels;

control means for deriving the average of the quantities A, B, C and D as a determination of axial distance traversed by said sensing array and providing a control output signal when said average equals said predetermined axial increment;

counting means for providing encoded counts representative of said quantities A, B, C and D;

said counting means including reset means responsive to said control signal to reset said counting means at the occurrence of each predetermined axial increment; and recorder means receiving said counts from said counting means and responsive to said control signal for recording the magnitude of said counts to provide a record of the quantities A, B, C and D as the parameters of magnitude and direction of curvature of said pipe section for each predetermined axial increment along a given length of said pipe section.

15. The invention defined in claim 14, wherein said recorder means comprises storage register means for receiving, accumulating and encoding said counts from said counting means; and magnetic tape recording means for recording said encoded counts in said register means;

said register means being responsive to said control signal to transmit said accumulated and encoded counts to said magnetic tape recording means at the conclusion of each predetermined increment of travel of said sensing array to provide in said magnetic tape recording means a recorded profile of curvature parameters for each incremental distance traversed along the axis of said pipe section by said sensing array.

16. Transducer means for generating and retaining data representative of the magnitude and direction of curvature of a pipe section at predetermined increments of axial length thereof, comprising:

at least one sensing array of two orthogonally disposed pairs of sensing wheels symmetrically disposed about the longitudinal axis of said pipe in a cross-sectional plane perpendicular to said axis and adapted to be placed in rolling contact with the inner wall of said pipe section;

means for moving said sensing array through said pipe section to cause said sensing wheels to roll along said inner wall in respective axial planes of said pipe section;

first, second, third and fourth wheel encoding means for providing distance output signals representative of the quantities A, B, C and D as a function of the respective distances travelled by the first, second, third and fourth sensing wheels along said inner wall, said first and second wheels comprising the first pair and said third and fourth wheels comprising the second pair of said orthogonally disposed pairs of wheels;

said pipe section having a cross-sectional radius $r$;

control means responsive to said distance signals for deriving the function $r(A+B+C+D)$ and for providing a control output signal when said function equals a predetermined power of ten;

counting means responsive to said distance signals for deriving the functions (A-B) and (C-D);

said counting means including reset means responsive to said control signal to reset said counting means upon the occurrence of said control signal whereupon the functions (A-B) and (C-D), respectively, comprise direct readouts of the magnitude of first and second orthogonally disposed components of curvature in the plane of said sensing array over a fixed axial increment achieved between the occurrence of successive control signals; and recorder means for receiving said functions (A-B) and (C-D) from said counting means and responsive to said control signal for recording the magnitudes of said functions (A-B) and (C-D) to provide a record of the magnitudes of the orthogonal components of curvature of said pipe section for each predetermined axial increment along a given length of said pipe section.

17. The invention defined in claim 16, wherein said recorder means comprises storage register means for receiving, accumulating and encoding said counts from said counting means; and magnetic tape recording means for recording said encoded counts in said register means;

said register means being responsive to said control signal to transmit said accumulated and encoded counts to said magnetic tape recording means at the conclusion of each predetermined increment of travel of said sensing array to provide in said magnetic tape recording means a recorded profile of curvature parameters for each incremental distance traversed along the axis of said pipe section by said sensing array.

18. Transducer means for generating and retaining data representative of the magnitude and direction of curvature of a pipe section at predetermined increments of axial length thereof, comprising:

at least one sensing array of two orthogonally disposed pairs of sensing wheels symmetrically disposed about the longitudinal axis of said pipe in a cross-sectional plane perpendicular to said axis and adapted to engage the inner wall of said pipe section in rolling contact;

means for moving said sensing array through said pipe section to cause said sensing wheels to roll along said inner wall in respective axial planes of said pipe section;

first, second, third and fourth wheel encoding means for providing distance output signals representative of the quantities A, B, C and D as a function of the respective distances travelled by the first, second, third and fourth sensing wheels along said inner wall, said first and second wheels comprising the first pair and said third and fourth wheels comprising the second pair of said orthogonally disposed pairs of wheels;

said pipe section having a cross-sectional radius $r$;

control means responsive to said distance signals for deriving the function $r(A+B+C+D) \div N$ where N is any number selected to constitute a predetermined axial increment of travel of said array when the function $r(A+B+C+D) \div N$ is equal to a predetermined power of ten and said control means providing a control output signal when said function equals said predetermined power of ten;

counting means responsive to said distance signals for deriving the functions (A-B) and (C-D);

said counting means including reset means responsive to said control signal to reset said counting means upon the occurrence of said control signal whereupon the functions (A-B) and (C-D), respectively, comprise direct readouts of the magnitude of first and second orthogonally disposed components of curvature in the plane of said sensing array over said axial increment as determined by the value of N; and recorder means receiving said functions (A-B) and (C-D) from said counting means and responsive to said control signal for recording the magnitude of said functions (A-B) and (C-D) to provide a record of the magnitude of the orthogonal components of curvature of said pipe section for each predetermined axial increment along a given length of said pipe section.

19. The invention defined in claim 18, wherein said recorder means comprises storage register means for receiving, accumulating and encoding said counts from said counting means; and magnetic tape recording means for recording said encoded counts in said register means;

said register means being responsive to said control signal to transmit said accumulated and encoded counts to said magnetic tape recording means at the conclusion of each predetermined increment of travel of said sensing array to provide in said magnetic tape recording means a recorded profile of curvature parameters for each incremental distance traversed along the axis of said pipe section by said sensing array.

20. An instrumented pig for measuring and recording a profile of variation in curvature over a length of pipeline traversed by said pig, comprising:

tractor means for causing said pig to travel through said length of pipeline;

transducer means coupled to said tractor means and including a housing, at least one sensing array comprising a plurality of sensing wheels mounted on said housing in symmetrical relationship to the longitudinal axis of a said pipeline, said sensing wheels being biased to engage the inner wall of said pipeline in rolling contact therewith for traversing said inner wall in respective paths substantially parallel to said axis and maintaining said transducer means substantially coaxially with said pipeline; and instrument means coupled with said transducer means and including an instrument housing and at least one symmetrical array of tracking wheels on said instrument housing, said tracking wheels being biased to engage the inner wall of said pipeline in rolling contact therewith to traverse the said pipeline in substantially parallel paths with said axis and maintain said instrument means substantially coaxially with said pipeline;

said transducer means further including encoder means generating data as a function of the distance travelled along the said inner wall of said pipeline by each of said sensing wheels and along said axis of said pipeline by said sensing array; and said instrument means further including recording means interconnected with said encoder means for receiving said data from said encoder means in correlation to the position of said sensing array along said length of pipeline to provide a record of curvature parameters and the position thereof along said length of pipeline traversed by said pig.

21. The invention defined in claim 20, wherein said transducer means includes a plurality of said sensing arrays axially spaced on said housing in predetermined relative orientation.

22. The invention defined in claim 20, wherein said instrument means includes a plurality of said tracking arrays axially spaced on said instrument housing.

23. The invention defined in claim 20, wherein said transducer means includes a plurality of said sensing arrays axially spaced on said housing in predetermined relative orientation; and wherein said instrument means includes a plurality of said tracking arrays axially spaced on said instrument housing.

24. An instrumental pig for measuring and recording a profile of variation in curvature over a length of pipeline traversed by said pig, comprising:

tractor means for causing said pig to traverse said length of pipeline;

transducer means coupled to said tractor means and including a housing, at least one sensing array comprising first, second and third sensing wheels mounted on said housing at symmetrical intervals about the longitudinal axis thereof, means biasing said sensing wheels to engage the inner wall of said pipeline in rolling contact therewith for traversing said pipeline in respective paths substantially parallel to the longitudinal axis of said pipeline and maintaining said housing substantially coaxially with said pipeline, said sensing wheels being disposed in a common transverse plane substantially perpendicular with said axis of said pipeline; and instrument means coupled with said transducer means and including an instrument housing and at least one symmetrical array of tracking wheels on said instrument housing, said tracking wheels being biased to engage the inner wall of said pipeline in rolling contact therewith to traverse said pipeline in substantially parallel paths with said axis and maintain said instrument means substantially coaxially within said pipeline;

said transducer means further including encoder means for generating data as a function of the distance travelled along the said inner wall of said pipeline by each of said sensing wheels;

and said instrument means further including recording means interconnected with said encoder means for receiving said data from said encoder means in correlation to the position of said sensing array along said length of pipeline to provide a record of curvature parameters and the position thereof along said length of pipeline traversed by said pig.

25. The invention defined in claim 24, wherein said transducer means includes a plurality of said sensing arrays axially spaced on said housing in predetermined relative orientation.

26. The invention defined in claim 24, wherein said instrument means includes a plurality of said tracking arrays axially spaced on said instrument housing.

27. The invention defined in claim 24, wherein said transducer means includes a plurality of said sensing arrays axially spaced on said housing in predetermined relative orientation; and wherein said instrument means includes a plurality of said tracking arrays axially spaced on said instrument housing.

28. An instrumented pig for measuring and recording a profile of variation in curvature over a length of a pipeline traversed by said pig, comprising:

tractor means for causing said pig to traverse said length of pipeline;

transducer means coupled to said tractor means and including a housing, at least one sensing array comprising first and second orthogonally disposed pairs of diametrically opposed sensing wheels mounted on said housing symmetrical with the longitudinal axis thereof, means biasing said sensing wheels to engage the inner wall of said pipeline in rolling contact therewith for traversing said pipeline in respective paths substantially parallel to the longitudinal axis of said pipeline and maintaining said housing substantially coaxial with said pipeline, said sensing wheels being disposed in a common transverse plane substantially perpendicular with said axis of said pipeline;

instrument means coupled with said transducer means and including an instrument housing and at least one symmetrical array of tracking wheels on said instrument housing, said tracking wheels being biased to engage the inner wall of said pipeline in rolling contact therewith to traverse said pipeline in substantially parallel paths with said axis and maintain said instrument means substantially coaxially within said pipeline;

said transducer means further including encoder means generating data as a function of the distance travelled along the said inner wall of said pipeline by each of said sensing wheels and along said axis of said pipeline by said sensing array; and said instrument means further including recording means interconnected with said encoder means for receiving said data from said encoder means in correlation to the position of said sensing array along said length of pipeline to provide a record of curvature parameters and the position thereof along said length of pipeline by said pig.

29. The invention defined in claim 28, wherein said transducer means includes a plurality of said sensing arrays axially spaced on said housing in predetermined relative orientation.

30. The invention defined in claim 28, wherein said instrument means includes a plurality of said tracking arrays axially spaced on said instrument housing.

31. The invention defined in claim 28, wherein said transducer means includes a plurality of said sensing arrays axially spaced on said housing in predetermined relative orientation; and wherein said instrument means includes a plurality of said tracking arrays axially spaced on said instrument housing.

32. An instrument pig for measuring and recording a profile of variation in curvature over a length of pipeline traversed by said pig, comprising:

tractor means for causing said pig to traverse said length of pipeline;

transducer means coupled to said tractor means and including a housing, at least one sensing array comprising a plurality of sensing wheels mounted on said housing in symmetrical relationship to the longitudinal axis of a said pipeline, said sensing wheel being biased to engage the inner wall of a said pipeline in rolling contact therewith for traversing said inner wall in respective paths substantially parallel to said axis and maintaining said transducer means substantially coaxially within said pipeline; and instrument means coupled with said transducer means and including an instrument housing and at least one symmetrical array of tracking wheels on said instrument housing, said tracking wheels being biased to engage the inner wall of said pipeline in rolling contact therewith to traverse said pipeline in substantially parallel paths with said axis and maintain said instrument means substantially coaxially within said pipeline;

said transducer means further including first encoder means for generating data as a function of the distance travelled along said inner wall of said pipeline by each of said sensing wheels and along said axis of said pipeline by said sensing array, and second encoder means for sensing the direction of gravity with reference to the orientation of said sensing array and for generating data as a function of that orientation; and said instrument means further including recording means interconnected with said first and second encoder means for receiving data from said encoder means in correlation to the position of said sensing array along said length of pipeline to provide a record of curvature parameters and gravitational reference parameters of said array in said pipeline and the position of said sensing wheels along said length of pipeline.

33. The invention defined in claim 32, wherein said transducer means includes a plurality of said sensing arrays axially spaced on said housing in predetermined relative orientation; and wherein said second encoder means senses the direction of gravity with reference to the orientation of each said sensing array and generates data as a function of said direction and relative orientation.

34. The invention defined in claim 32, wherein said instrument means includes a plurality of said tracking arrays axially spaced on said instrument housing.

35. The invention defined in claim 32, wherein said transducer means includes a plurality of said sensing arrays axially spaced on said housing in predetermined relative orientation;

wherein said second encoder means senses the direction of gravity with reference to the orientation of each said sensing array and generates data as a function of said direction and relative orientation; and wherein said instrument means includes a plurality of said tracking arrays axially spaced on said instrument housing.

36. An instrument pig for measuring and recording a profile of variation in curvature over a length of a pipeline traversed by said pig; comprising:

tractor means for causing said pig to traverse said length of pipeline;

transducer means coupled to said tractor means and including a housing, at least one sensing array comprising first, second and third sensing wheels mounted on said housing at symmetrical intervals about the longitudinal axis thereof, means biasing said sensing wheels to engage the inner wall of said pipeline in rolling contact therewith for traversing said pipeline in respective paths substantially parallel to the longitudinal axis of said pipeline and maintaining said housing substantially coaxially with said pipeline, said sensing wheels being disposed in a common transverse plane substantially perpendicular with said axis of said pipeline;

instrument means coupled with said transducer means and including an instrument housing and at least one symmetrical array of tracking wheels on said instrument housing, said tracking wheels being biased to engage the inner wall of said pipeline in rolling contact therewith to traverse said pipeline in substantially parallel paths with said axis and maintain said instrument means substantially coaxially within said pipeline;

said transducer means further including first encoder means generating data as a function of the distance travelled along said inner wall of said pipeline by each of said sensing wheels and along said axis of said pipeline by said sensing array, and second encoder means for sensing the direction of gravity with reference to the orientation of said sensing array and generating data as a function of that orientation; and said instrument means further including recording means, interconnected with said first and second encoder means for receiving data from said encoder means in correlation to the position of said sensing array along said length of pipeline to provide a record of curvature parameters and gravitational reference parameters of said array in said pipeline and the position of said sensing wheels along said length of pipeline.

37. The invention defined in claim 36, wherein said transducer means includes a plurality of said sensing arrays axially spaced on said housing in predetermined relative orientation; and wherein said second encoder means senses the direction of gravity with reference to the orientation of each said sensing array and generates data as a function of said direction and relative orientation.

38. The invention defined in claim 36, wherein said instrument means includes a plurality of said tracking arrays axially spaced on said instrument housing.

39. The invention defined in claim 36, wherein said transducer means includes a plurality of said sensing arrays axially spaced on said housing in predetermined relative orientation;

wherein said second encoder means senses the direction of gravity with reference to the orientation of each said sensing array and generates data as a function of said direction and relative orientation; and wherein said instrument means includes a plurality of said tracking arrays axially spaced on said instrument housing.

40. An instrumented pig for measuring and recording a profile of variation in curvature over a length of a pipeline traversed by said pig, comprising:

tractor means for causing said pig to traverse said length of pipeline;

transducer means coupled to said tractor means and including a housing, at least one sensing array comprising first and second orthogonally disposed pairs of diametrically opposed sensing wheels mounted on said housing symmetrical with the longitudinal axis thereof, means biasing said sensing wheels to engage the inner wall of said pipeline in rolling contact therewith for traversing said pipeline in respective paths substantially parallel to the longitudinal axis of said pipeline and maintaining said housing substantially coaxial with said pipeline, said sensing wheels being disposed in a common transverse plane substantially perpendicular with said axis of said pipeline;

instrument means coupled with said transducer means and including an instrument housing and at least one symmetrical array of tracking wheels on said instrument housing, said tracking wheels being biased to engage the inner wall of said pipeline in rolling contact therewith to traverse said pipeline in substantially parallel paths with said axis and maintain said instrument means substantially coaxially within said pipeline;

said transducer means further including first encoder means for generating data as a function of the distance travelled along the said inner wall of said pipeline by each of said sensing wheels and along said axis of said pipeline by said sensing array, and second encoder means for sensing the direction of gravity with reference to the orientation said sensing array and for generating data as a function of that orientation; and said instrument means further including recording means interconnected with said first and second encoder means for receiving data therefrom in correlation with the position of said sensing array along said length of pipeline to provide a record of curvature parameters and gravitational reference parameters of said array in said pipeline and the position of said sensing wheels along said length of pipeline.

41. The invention defined in claim 40, wherein said transducer means includes a plurality of said sensing arrays axially spaced on said housing in predetermined relative orientation; and wherein said second encoder means senses the direction of gravity with reference to the orientation of each said sensing array and generates data as a function of said direction and relative orientation.

42. The invention defined in claim 40, wherein said instrument means includes a plurality of said tracking arrays axially spaced on said instrument housing.

43. The invention defined in claim 40, wherein said transducer means includes a plurality of said sensing arrays axially spaced on said housing in predetermined relative orientation;

wherein said second encoder means senses the direction of gravity with reference to the orientation of each said sensing array and generates data as a function of said direction and relative orientation; and wherein said instrument means includes a plurality of said tracking arrays axially spaced on said instrument housing.

44. Transducer means for generating and retaining data representative of the magnitude and direction of curvature of a pipe section at predetermined increments of axial length thereof, comprising:

at least one sensing array of at least three sensing wheels symmetrically disposed about the longitudinal axis of said pipe in a cross-sectional plane perpendicular to said axis in rolling contact with the inner wall of said pipe section;

means for moving said sensing array through said pipe section to cause said sensing wheels to roll along said inner wall in respective axial planes of said pipe section;

encoder means for generating counts representative of the distance travelled by each said sensing wheel along a predetermined incremental length of said pipe section;

gravitational reference means for sensing the relative orientation of said sensing array with reference to the direction of gravity in the plane of said sensing wheels and for generating encoded data as a function of said relative orientation; and recorder means for receiving and retaining said counts and said encoded gravitational reference data for subsequent calculation.

45. Transducer means for generating and retaining data representative of the magnitude and direction of curvature of a pipe section at predetermined increments of axial length thereof, comprising:

at least one sensing array of at least three sensing wheels symmetrically disposed about the longitudinal axis of said pipe in a cross-sectional plane perpendicular to said axis and in rolling contact with the inner wall of said pipe section;

means for moving said sensing array through said pipe section to cause said sensing wheels to roll along said inner wall in respective axial planes of said pipe section;

wheel encoding means for providing distance output signals representative of the distance travelled by each of said sensing wheels along said inner wall;

control means responsive to said distance signals for providing a control output signal upon the occurrence of each predetermined incremental distance of travel of said sensing array axially of said pipe;

counting means responsive to said distance signals for generating a count for each said sensing wheel representative of the actual distance travelled thereby over the incremental axial distance of travel of said sensing array;

said counting means including reset means responsive to said control signal to reset said counting means at the occurrence of each predetermined increment of travel of said sensing array;

gravitational reference means for sensing the relative orientation of said sensing array with reference to the direction of gravity and for generating encoded data as a function of said relative orientation; and recorder means receiving said counts from said counting means and said encoded data from said gravitational reference means and responsive to said control signal for recording the magnitude of said counts and said encoded gravitational reference data upon each occurrence of said control signal, thereby to provide a record of parameters defining the curvature, and the orientation of such curvature with reference to the direction of gravity for each predetermined incremental distance along a given length of pipe.

46. The invention defined in claim 45, wherein said control means comprises averaging means for deriving the average distance of travel of all said sensing wheels to determine said predetermined incremental distance of travel of said sensing array axially of said pipe.

47. The invention defined in claim 45, wherein said recorder means comprises storage register means for receiving, accumulating and encoding said counts from said counting means, and for receiving said encoded gravitational reference data; and magnetic tape recording means for recording said encoded counts and said encoded gravitational reference data from said register means;

said register means being responsive to said control signal to transmit said accumulated and encoded counts and encoded gravitational reference data to said magnetic tape recording means at the conclusion of each predetermined increment of travel of said sensing array to provide in said magnetic tape recording means a recorded profile of parameters defining the curvature and the direction of such curvature with reference to the direction of gravity for each incremental distance traversed along the axis of said pipe section by said sensing array.

48. Transducer means for generating and retaining data representative of the magnitude and direction of curvature of a pipe section at predetermined increments of axial length thereof, comprising:

at least one sensing array of two orthogonally disposed pairs of sensing wheels symmetrically disposed about the longitudinal axis of said pipe in a cross-sectional plane perpendicular to said axis and in rolling contact with the inner wall of said pipe section;

means for moving said sensing array through said pipe section to cause said sensing wheels to roll along said inner wall in respective axial planes of said pipe section;

wheel encoding means for providing distance output signals representative of the distance travelled by each of said sensing wheels along said inner wall;

control means responsive to said distance signals for providing a control output signal upon the occurrence of each predetermined incremental distance of travel of said sensing array axially of said pipe;

counting means responsive to said distance signals for generating a count for each said sensing wheel representative of the actual distance travelled thereby over the incremental axial distance of travel of said sensing array;

said counting means including reset means responsive to said control signal to reset said counting means at the occurrence of each predetermined increment of travel of said sensing array;

gravitational reference means for sensing the relative orientation of said sensing array with reference to the direction of gravity and for generating encoded data as a function of said relative orientation; and recorder means for receiving said counts from said counting means and said encoded data from said gravitational reference means and responsive to said control signal for recording the magnitude of said counts and said encoded gravitational data upon each occurrence of said control signal to provide a record of parameters defining the curvature and the orientation of such curvature with reference to the direction of gravity for each predetermined incremental distance along a given length of pipe.

49. The invention defined in claim 48, wherein said recorder means comprises storage register means for receiving, accumulating and encoding said counts from said counting means and for receiving said encoded gravitational reference data; and magnetic tape recording means for recording said encoded counts and said encoded gravitational reference data in said register means;

said register means being responsive to said control signal to transmit said accumulated and encoded counts and encoded gravitational reference data to said magnetic tape recording means at the conclusion of each predetermined increment of travel of said sensing array to provide in said magnetic tape recording means a recorded profile of parameters defining the curvature and the direction of such curvature with reference to the direction of gravity for each incremental distance traversed along the axis of said pipe section by said sensing array.

50. Transducer means for generating and retaining data representative of the magnitude and direction of curvature of a pipe section at predetermined increments of axial length thereof, comprising;

at least one sensing array of two orthogonally disposed pairs of sensing wheels symmetrically disposed about the longitudinal axis of said pipe in a cross-sectional plane perpendicular to said axis and in rolling contact with the inner wall of said pipe section;

means for moving said sensing array through said pipe section to cause said sensing wheels to roll along said inner wall in respective axial planes of said pipe section;

first, second, third and fourth wheel encoding means providing distance output signals representative of the quantities A, B, C and D as a function of the respective distances travelled by the first, second, third and fourth sensing wheels along said inner wall, said first and second wheels comprising the first pair and said third and fourth wheels comprising the second pair of said orthogonally disposed pairs of wheels;

control means for summing the quantities A, B, C and D and providing a control output signal representative of a predetermined sum of said quantities and thereby functionally defining said predetermined axial increment traversed by said sensing array;

counting means for providing respective encoded counts representative of said quantities A, B, C and D;

said counting means including reset means responsive to said control signal to reset said counting means at the occurrence of each one of said predetermined axial increments;

gravitational reference means for sensing the relative orientation of said sensing array with reference to the direction of gravity and for generating encoded data as a function of said relative orientation; and recorder means for receiving said encoded gravitational reference data from said gravitational reference means and said counts from said counting means and responsive to said control signal for recording said encoded gravitational reference data and the magnitude of said counts to provide a record of the quantities A, B, C and D and said encoded gravitational reference data as the parameters of magnitude and direction of curvature of said pipe section referenced to the direction of gravity for each predetermined axial increment along a given length of said pipe section.

51. The invention defined in claim 50, wherein said recorder means comprises storage register means for receiving, accumulating and encoding said counts from said counting means and for receiving said encoded gravitational reference data; and magnetic tape recording means for recording said encoded counts and said encoded gravitational reference data in said register means;

said register means being responsive to said control signal to transmit said accumulated and encoded counts and encoded gravitational reference data to said magnetic tape recording means at the conclusion of each predetermined increment of travel of said sensing array to provide in said magnetic tape recording means a recorded profile of parameters defining the pipe curvature and the direction of such curvature with reference to the direction of gravity for each incremental distance traversed along the axis of said pipe section by said sensing array.

52. Transducer means for generating and retaining data representative of the magnitude and direction of curvature of a pipe section at predetermined increments of axial length thereof, comprising:

at least one sensing array of two orthogonally disposed pairs of sensing wheels symmetrically disposed about the longitudinal axis of said pipe in a cross-sectional plane perpendicular to said axis and in rolling contact with the inner wall of said pipe section;

means for moving said sensing array through said pipe section to cause said sensing wheels to roll along said inner wall in respective axial planes of said pipe section;

first, second, third and fourth wheel encoding means for providing distance output signals representative of the quantities A, B, C and D as a function of the respective distances travelled by the first, second, third and fourth sensing wheels along said inner wall, said first and second wheels comprising the first pair and said third and fourth wheels comprising the second pair of said orthogonally disposed pairs of wheels;

control means for deriving the average of the quantities A, B, C and D as a determination of axial distance traversed by said sensing array and providing a control output signal when said average equals said predetermined axial increment;

counting means for providing encoded counts representative of said quantities A, B, C and D;

said counting means including reset means responsive to said control signal to reset said counting means at the occurrence of each predetermined axial increment;

gravitational reference means for sensing the relative orientation of said sensing array with reference to the direction of gravity and for generating encoded data as a function of said relative orientation; and recorder means for recording said encoded gravitational reference data and the magnitude of said counts to provide a record of the quantities A, B, C and D and said encoded gravitational reference data as the parameters of magnitude and direction of curvature of said pipe section referenced to the direction of gravity for each predetermined axial increment along a given length of said pipe section.

53. The invention defined in claim 52, wherein said recorder means comprises storage register means for receiving, accumulating and encoding said counts from said counting means and for receiving said encoded gravitational reference data; and magnetic tape recording means for recording said encoded counts and said encoded gravitational reference data in said register means;

said register means being responsive to said control signal to transmit said accumulated and encoded counts and encoded gravitational reference data to said magnetic tape recording means at the conclusion of each predetermined increment of travel of said sensing array to provide in said magnetic tape recording means a recorded profile of parameters defining the pipe curvature and the direction of such curvature with reference to the direction of gravity for each incremental distance traversed along the axis of said pipe section by said sensing array.

54. Transducer means for generating and retaining data representative of the magnitude and direction of curvature of a pipe section at predetermined increments of axial length thereof, comprising:

at least one sensing array of two orthogonally disposed pairs of sensing wheels symmetrically disposed about the longitudinal axis of said pipe in a cross-sectional plane perpendicular to said axis and in rolling contact with the inner wall of said pipe section;

means for moving said sensing array through said pipe section to cause said sensing wheels to roll along said inner wall in respective axial planes of said pipe section;

first, second, third and fourth wheel encoding means for providing distance output signals representative of the quantities A, B, C and D as a function of the respective distances travelled by the first, second, third and fourth sensing wheels along said inner wall, said first and second wheels comprising the first pair and said third and fourth wheels comprising the seond pair of said orthogonally disposed pairs of sensing wheels;

said pipe section having a cross-sectional radius $r$;

control means responsive to said distance signals for deriving the function $r(A+B+C+D)$ and for providing a control output signal when said function equals a predetermined power of ten;

counting means responsive to said distance signals for deriving the functions (A-B) and (C-D);

said counting means including reset means responsive to said control signal to reset said counting means upon the occurrence of said control signal, whereupon the functions (A-B) and (C-D), respectively, comprise direct readouts of the magnitude of first and second orthogonally disposed components of curvature in the plane of said sensing array over a fixed axial increment achieved between the occurrence of successive control signals;

gravitational reference means for sensing the relative orientation of at least one of said components of curvature with reference to the direction of gravity and for generating encoded data as a function of said relative orientation; and recorder means receiving said functions (A-B) and (C-D) from said counting means and said encoded gravitational reference data from said gravitational reference means and responsive to said control signal for recording said functions (A-B) and (C-D) and said gravitational reference data to provide a record of the magnitude of the orthogonal components of curvature of said pipe section and the direction of the resultant curvature of said components referenced to the direction of gravity for each predetermined axial increment along a given length of said pipe section.

55. The invention defined in claim 54, wherein said recorder means comprises storage register means for receiving, accumulating and encoding said counts from said counting means and for receiving said encoded gravitational reference data; and magnetic tape recording means for recording said encoded counts and said encoded gravitational reference data in said register means; and said register means being responsive to said control signal to transmit said accumulated and encoded counts and encoded gravitational reference data to said magnetic tape recording means at the conclusion of each predetermined increment of travel of said sensing array to provide in said magnetic tape recording means a recorded profile of parameters defining the pipe curvature and the direction of such curvature with reference to the direction of gravity for each incremental distance traversed along the axis of said pipe section by said sensing array.

56. Transducer means for generating and retaining data representative of the magnitude and direction of curvature of a pipe section at predetermined increments of axial length thereof, comprising;

at least one sensing array of two orthogonally disposed pairs of sensing wheels symmetrically disposed about the longitudinal axis of said pipe in a cross-sectional plane perpendicular to said axis and in rolling contact with the inner wall of said pipe section;

means for moving said sensing array through said pipe section to cause said sensing wheels to roll along said inner wall in respective axial planes of said pipe section;

first, second, third and fourth wheel encoding means for providing distance output signals representative of the quantities A, B, C and D as a function of the respective distances travelled by the first, second, third and fourth sensing wheels along said inner wall, said first and second wheels comprising the first pair and said third and fourth wheels comprising the second pair of said orthogonally disposed pairs of sensing wheels;

said pipe section having a cross-sectional radius $r$;

control means responsive to said distance signals for deriving the function $r(A+B+C+D) \div N$ where N is any number selected to constitute a predetermined axial increment of travel of said array when the function $r(A+B+C+D) \div N$ is equal to a predetermined power of ten, and said control means providing a control output signal when said function equals said predetermined power of ten;

counting means responsive to said distance signals for deriving the functions (A-B) and (C-D);

said counting means including reset means responsive to said control signal to reset said counting means upon the occurrence of said control signal, whereupon the functions (A-B) and (C-D), respectively, comprise direct readouts of the magnitude of first and second orthogonally disposed components of curvature in the plane of said sensing array over said axial increment;

gravitational reference means for sensing the relative orientation of at least one of said components of curvature with reference to the direction of gravity and for generating encoded data as a function of said relative orientation; and recorder means receiving said functions (A-B) and (C-D) from said counting means and said encoded gravitational reference data from said gravitational reference means and responsive to said control signal for recording said functions (A-B) and (C-D) and said gravitational reference data to provide a record of the magnitude of the orthogonal components of curvature of said pipe section and the direction of the resultant curvature of said components referenced to the direction of gravity for each predetermined axial increment along a given length of said pipe section.

57. The invention defined in claim 56, wherein said recorder means comprises storage register means for receiving, accumulating and encoding said counts from said counting means and for receiving said encoded gravitational reference data; and magnetic tape recording means for recording said encoded counts and said encoded gravitational reference data in said register means; and said register means being responsive to said control signal to transmit said accumulated and encoded counts and encoded gravitational reference data to said magnetic tape recording means at the conclusion of each predetermined increment of travel of said sensing array to provide in said magnetic tape recording means a recorded profile of curvature parameters defining the curvature and the direction of such curvature with reference to the direction of gravity for each incremental distance traversed along the axis of said pipe section by said sensing array.

58. The method of measuring deviations in curvature of an elongated pipe section from an established curvature condition thereof over a finite length of said pipe section, comprising:
1. moving through said pipe section an array of sensing means having a predetermined relative orientation and symmetrical disposition about the longitudinal axis of said pipe section in a plane substantially perpendicular to said axis;
2. sensing parametric variations caused by curvature in said pipe section at each said sensing means as said array is moved over predetermined incremental distances along the length of said pipe section;
3. recording said parametric variations in correlation to each said predetermined incremental distance on a recording medium to provide a first profile of variations in curvature and the positions of such variations over the length of said pipe section;
4. repeating steps (1), (2) and (3), in that order, at a later time to provide a second profile of variations in curvature and the positions of such variations over the length of said pipe section;
5. comparing said first and second profiles in reference to a predetermined allowable deviation for each said predetermined incremental distance and detecting variations between said profiles in excess of said deviation and the position of said variations over the length of said pipe section.

59. The method of measuring deviations in curvature of an elongated pipe section from an established curvature condition thereof over a finite length of said pipe section, comprising:
1. moving an array of sensing wheels of predetermined relative orientation and symmetrical disposition about the longitudinal axis of said pipe section in a transverse plane perpendicular to said axis and with said wheels in rolling contact with the inner wall of said pipe section, through said pipe section with said wheels rolling in paths substantially parallel to said axis;
2. sensing the actual distance travelled by each of said sensing wheels over predetermined incremental distances travelled by said sensing array along the length of said pipe section as the parameters of curvature over said incremental distances;
3. recording said distances in correlation to each said predetermined incremental distance on a first recording medium to provide a first profile of parametric variations in pipe curvature and the positions of such variations over the length of said pipe section;
4. converting said first profile to a second profile of the magnitude and direction of resultant curvatures and the position thereof over the length of the pipe section by converting said distance parameters to magnitude and direction of resultant curvature over each said incremental length and recording said second profile on a second recording medium;
5. repeating steps (1), (2), (3) and (4), in that order, at a later time to provide a fourth profile of the magnitude and direction of resultant curvatures and the position thereof over the length of said pipe section; and
6. comparing said second and fourth profiles in reference to a predetermined allowable deviation in the magnitude and direction of resultant curvatures for each said incremental distance and detecting variations between said profiles in excess of said deviation and the position of said variations over the length of said pipe section.

60. The method of measuring deviation in curvature of an elongated pipe section from an established curvature condition thereof over a finite length of said pipe section, comprising:
1 moving an array of sensing wheels of predetermined relative orientation and symmetrical disposition about the longitudinal axis of said pipe section in a transverse plane perpendicular to said axis and with said wheels in rolling contact with the inner wall of said pipe section, through said pipe section with said wheels rolling in paths substantially parallel to said axis;
2 generating a number of pulses in proportion to the distance travelled by each said sensing wheel;
3 counting said pulses to generate a like plurality of counts respectively representing the distance travelled by said plurality of sensing wheels;
4 continuously averaging the sum of said counts until the average thereof is representative of a predetermined incremental length of travel of said sensing array axially of said pipe section;
5 recording said counts upon the occurrence of said representative average; and 6 repeating steps (2), (3), (4) and (5), in that order, for each succeeding incremental distance along the length of said pipe section to provide a recorded profile of the curvature parameters thereof, over each said incremental length, correlated to a known position along the length of said pipe section.

61. The method of claim 60, including the additional steps of:
7 repeating steps (1), (2), (3), (4), (5) and (6) in that order at a later time to provide a second recorded profile of curvature parameters correlated to a said known position along the length of said pipe section; and
8 comparing said first and second profiles in reference to a predetermined allowable deviation in said curvature parameters for each said incremental distance and detecting variations in said parameters of said profiles in excess of said deviation and the position of said variations over the length of said pipe section.

62. Transducer means for generating and retaining data representative of the curvature of a pipe section on a given cross-sectional diameter thereof comprising:
first and second distance sensing means positioned at the inner wall of said pipe section at opposite ends of said given diameter;
means for moving said distance sensing means through said pipe section to cause said distance sensing means to traverse said inner wall in a plane defined by said given diameter and the longitudinal axis of said pipe section;
encoder means for generating data representative of the distance travelled by each said distance sensing means along a predetermined finite length of said pipe section; and
recording means for receiving and retaining said data for subsequent calculation.

63. The invention defined in claim 62, wherein said transducer means further includes gravitational direction sensing means for sensing the direction of gravity, and
wherein said encoder means further generates data representing the angular orientation of said internal wall length measuring means relative to said gravitational direction.

64. Transducer means for generating and retaining data representative of the magnitude and direction of curvature of a pipe section at predetermined increments of axial length thereof, comprising:
at least one sensing array of at least three distance sensing means symmetrically disposed about the longitudinal axis of said pipe in a cross-sectional plane perpendicular to said axis and positioned at the inner wall of said pipe section;
encoder means for generating data representative of the distance travelled by each said distance sensing means along a predetermined incremental length of said pipe section; and
recording means for receiving and retaining said data for subsequent calculation.

65. The invention defined in claim 64, wherein said transducer means further includes gravitational direction sensing means for sensing the direction of gravity; and
wherein said encoder means further generates data representing said gravitational direction.

66. Transducer means for generating and retaining data representative of the magnitude and direction of curvature of a pipe section at predetermined increments of axial length thereof, comprising:
at least one sensing array of at least three distance sensing means symmetrically disposed about the longitudinal axis of said pipe in a cross-sectional plane perpendicular to said axis and positioned at the inner wall of said pipe section;
means for moving said sensing array through said pipe section to cause said distance sensing means to traverse said inner wall in respective axial planes of said pipe section;
encoding means for providing respective distance output signals representative of the distance travelled by each of said distance sensing means along said inner wall;
control means responsive to said distance signals for providing a control output signal upon the occurrence of each predetermined incremental distance of travel of said sensing array axially of said pipe;
counting means responsive to said distance signals for generating a count for each said distance sensing means representative of the actual length of said inner wall traversed thereby over the incremental axial distance of travel of said sensing array;
said counting means including reset means responsive to said control signal to reset said counting means at the occurrence of each predetermined increment of travel of said sensing array; and
recorder means for receiving said counts from said counting means and responsive to said control signal to provide a record of curvature parameters for each predetermined incremental distance along a given length of pipe.

67. The invention defined in claim 66, wherein said transducer means further includes gravitational direction sensing and encoding means for providing coded output data representative of said gravitational direction relative to the orientation said sensing array; and
wherein said recorder means further receives and records said gravitational data upon the occurrence of said control signal.

68. The invention defined in claim 66, wherein said control means comprises averaging means for deriving the average distance of travel of all said distance sensing means to determine said predetermined incremental distance of travel of said sensing array axially of said pipe.

69. The invention defined in claim 68, wherein said transducer means further includes gravitational direction sensing and encoding means for providing coded output data representative of said gravitational direction relative to said sensing array; and
wherein said recorder means further receives and records said gravitational data upon the occurrence of a said control signal.

70. Transducer means for generating and retaining data representative of the curvature of a pipe section at each of a plurality of incremental axial distances along the length thereof while axially traversing said pipe, comprising:
axial length measuring means for defining predetermined axial increments of distance;
internal wall length measuring means controlled by said axial length measuring means for defining the length of said internal wall of said pipe over each said axial increment in at least three axial planes of said pipe;

encoder means for generating data representing each occurrence of a said axial incremental distance and the respective lengths of said internal wall over said incremental distance; and recording means responsive to said data to record the occurrence of each said incremental distance and the corresponding said internal wall lengths over said incremental distance at each such occurrence, over the length of said pipe section 71. The invention defined in claim 70, wherein said transducer means further includes gravitational direction sensing means for sensing the direction of gravity, and wherein said encoder means further generates data representing the angular orientation of said internal wall length measuring means relative to said gravitational direction; and wherein said recorder means further records said gravitational orientation data at said occurrence of each said incremental distance.

72. The method of generating and collecting data for measuring the curvature of a finite length of pipe section, comprising:
 1 moving an array of sensing wheels of predetermined relative orientation and symmetrical disposition about the longitudinal axis of said pipe section and with said wheels in rolling contact with the inner wall of said pipe section, through said pipe section with said wheels rolling in paths substantially parallel to said axis;
 2 for each sensing wheel, generating a number of pulses in proportion to the distance travelled by each wheel;
 3 counting said pulses to generate a like plurality of counts respectively representing the distance travelled by each sensing wheel;
 4 continuously averaging the sum of said counts until the average thereof is representative of a predetermined incremental length of travel of said sensing array axially of said pipe section; and
 5 recording said counts upon the occurrence of said representative average.

73. The method of generating and collecting data for a profile of variations in curvature of a finite length of pipe section, comprising:
 1 moving through said pipe section an array of sensing means of predetermined relative orientation and symmetrical disposition about the longitudinal axis of said pipe section in a plane substantially perpendicular to said axis;
 2 sensing parametric variations caused by curvature in said pipe section at each said sensing means as said array is moved over predetermined incremental distances along the length of said pipe section; and
 3 recording said parametric variations in correlation to each said predetermined incremental distance on a recording medium to provide a profile of variations in curvature and the position of such variations over the length of said pipe section.

74. Transducer means for generating and retaining data representative of the curvature of a pipe section comprising:

a multiplicity of sensing wheels of known dimensions adapted to be placed in rolling contact with the inner walls of said pipe section and arranged in angular spaced relationship about the longitudinal axis of the pipe section;

means for moving said sensing wheels through said pipe section to cause said sensing wheels to roll along said inner walls;

encoder means for generating counts representative of the distance travelled by each sensing wheel; and means for receiving and retaining said counts for subsequent calculations.

75. Transducer means for producing information signals representative of the curvaturre along the length of a pipe section, comprising:

a plurality of rotatable wheels disposed in angular spaced relationship about the longitudinal axis of said pipe section and each adapted to contact the wall of said pipe section and to rotate when moved along said wall;

means for moving said wheels together along the length of said pipe section, means associated with each of said wheels for generating data as a function of the rotation of its respective wheel along the pipe section, and data processing means responsive to said data for providing information signals representing quantities determinative of pipe curvature at locations along the pipe section.

76. The combination claimed in claim 75, wherein said data processing means includes means for providing an information signal representing each given distance of movement of said wheels along the wall of the pipe section.

77. The combination claimed in claim 76 including means for providing information signals representative of the angular orientation of said wheels about the longitudinal axis of said pipe section relative to a fixed direction.

78. The combination claimed in claim 77 wherein said fixed direction is the direction of gravitational force.

* * * * *